(12) United States Patent
Wala et al.

(10) Patent No.: US 8,050,246 B2
(45) Date of Patent: Nov. 1, 2011

(54) RANGE EXTENSION FOR TIME DIVISION DUPLEX SYSTEMS

(75) Inventors: Philip M. Wala, Waseca, MN (US);
Harold A. Roberts, Prior Lake, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 239 days.

(21) Appl. No.: 12/396,899

(22) Filed: Mar. 3, 2009

(65) Prior Publication Data

US 2010/0226296 A1    Sep. 9, 2010

(51) Int. Cl.
    *H04B 7/212* (2006.01)
(52) U.S. Cl. ......... 370/347; 370/345; 370/358; 370/465
(58) Field of Classification Search .................. None
    See application file for complete search history.

(56) References Cited

U.S. PATENT DOCUMENTS

| | | | | | |
|---|---|---|---|---|---|
| 5,615,215 | A | * | 3/1997 | Utting et al. | 370/337 |
| 5,689,502 | A | * | 11/1997 | Scott | 370/281 |
| 5,825,764 | A | * | 10/1998 | Rudolph | 370/337 |
| 6,091,763 | A | * | 7/2000 | Boetzel et al. | 375/211 |
| 6,094,421 | A | * | 7/2000 | Scott | 370/280 |
| 7,212,540 | B2 | * | 5/2007 | Unitt et al. | 370/452 |
| 2001/0009544 | A1 | | 7/2001 | Vanttinen et al. | |
| 2002/0191565 | A1 | * | 12/2002 | Mani et al. | 370/334 |
| 2005/0117521 | A1 | | 6/2005 | Abrol et al. | |
| 2008/0205336 | A1 | * | 8/2008 | Lee et al. | 370/329 |
| 2009/0049356 | A1 | | 2/2009 | Lin | |
| 2009/0257392 | A1 | * | 10/2009 | Hosein | 370/329 |
| 2010/0190509 | A1 | * | 7/2010 | Davis | 455/456.1 |

OTHER PUBLICATIONS

International Searching Authority, "International Search Report", Sep. 29, 2010, Published in: WO.

* cited by examiner

*Primary Examiner* — Donald Mills
(74) *Attorney, Agent, or Firm* — Fogg & Powers LLC

(57) ABSTRACT

A method of scheduling time division duplex frames at a base station in a time division duplex system is provided. The method includes determining if the round-trip propagation delay between the base station and a communicatively coupled subscriber station is greater than the difference between the base station turn-around time and the minimum allowed subscriber station turn-around time, and modifying time slots in a time division duplex frame being sent to the subscriber station over a communication link to extend the range of signals sent from the base station.

29 Claims, 11 Drawing Sheets

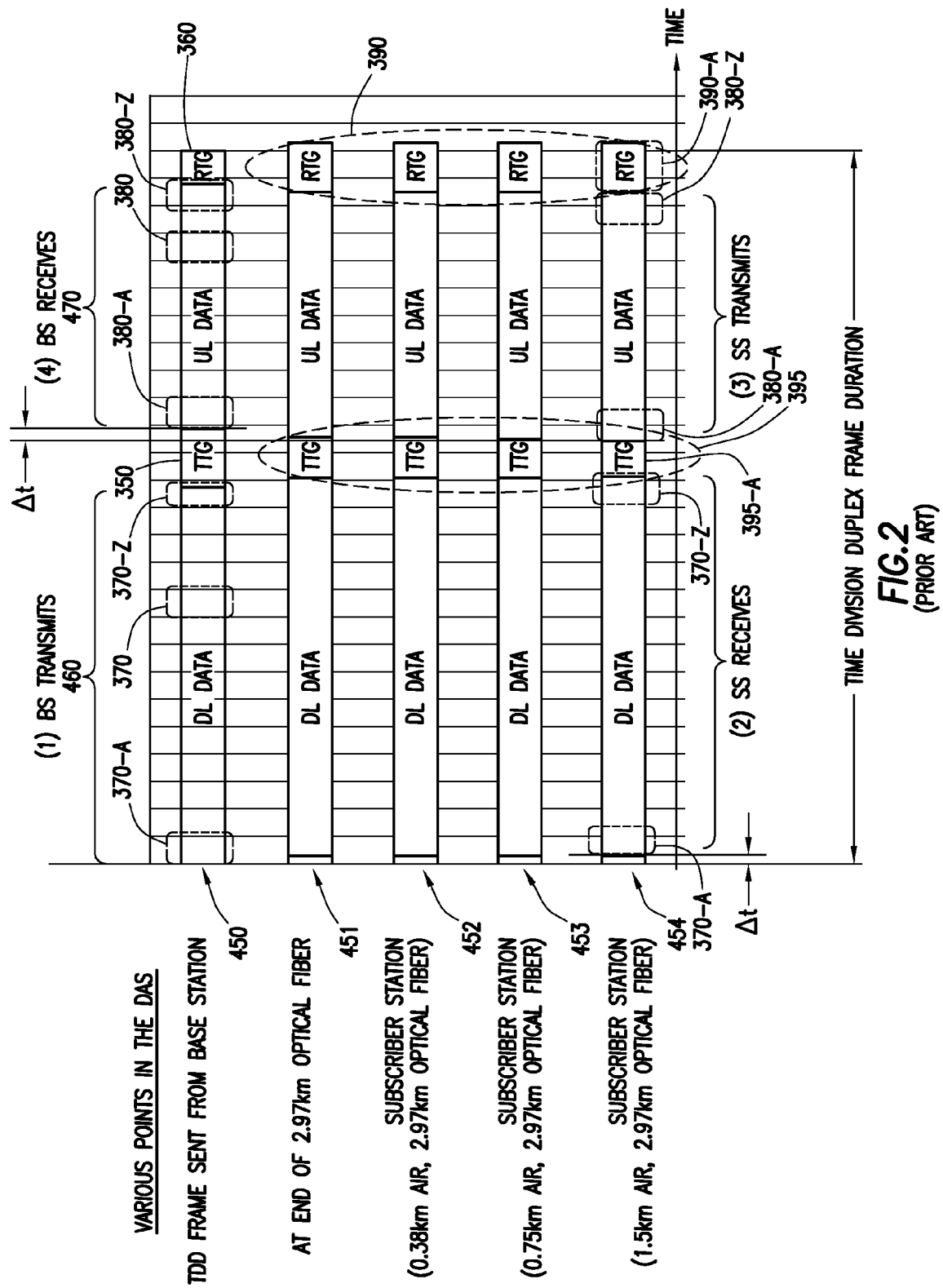

RANGE EXTENSION FOR TIME DIVISION DUPLEX SYSTEMS

BACKGROUND

One common time division duplex system configuration employs equipment located at a centralized location and equipment that is remotely located from the centralized location. The equipment located at a centralized location is controlled by a wireless service provider. The equipment that is located at the centralized locations consists of at least one base station and can also include distributed antenna "host" or "hub" units. The remotely located equipment consists of subscriber units or subscriber stations, which are typically not controlled by the wireless service provider. Optional equipment at other remote locations (which may or may not be controlled by the wireless service provider) consists of remote antenna units or remote radio heads.

One such system is a time division duplex system in which radio frequency (RF) signals are communicated between a base station and one or more subscriber stations. In one system configuration, the subscriber station is communicatively coupled to the base station by an antenna on the base station. In another system configuration, the subscriber station is communicatively coupled to the base station by an optical fiber and a remote antenna. In yet another system configuration, subscriber stations are communicatively coupled to the base station by at least one antenna on the base station and by one or more optical fibers and associated remote antennas. A distributed antenna system (DAS) is a system that includes optical fiber links to communicatively couple the base station to remote antenna units, which are communicatively coupled to subscriber stations located within the broadcast range of the remote antenna units.

In any of these configurations, time division duplex systems use the same channel band for downlink and uplink transmissions. Although it is theoretically possible to separate simultaneous downlink and uplink transmissions using directional couplers, the non-ideal nature of directionality in real couplers and the enormous differential between transmit and receive power levels will cause downlink/uplink interference if the transmissions are simultaneous. As a result, the base station or subscriber station cannot transmit and receive at the same time. The base station in the time division duplex system must either be transmitting in the downlink or receiving in the uplink but not both simultaneously. Likewise, the subscriber station must be receiving in the downlink or transmitting in the uplink but not both simultaneously.

The time division duplex system transmits time division duplex frames having an uplink frame (subscriber station to base station) and a downlink frame (base station to subscriber station). The time division duplex systems have a distance limitation between the base station and the subscriber station. The distance limitation is based on an allowed turn-around time that is provided between the downlink frames and the uplink frames of the time division duplex frame. If the round-trip propagation delay of the signals traveling the communication link is greater than the difference between the base station turn-around time and the minimum allowed subscriber station turn-around time, the base station and/or the subscriber station are unable to receive all the data in the time division duplex frame.

If the base station and subscriber station were collocated and could instantaneously switch from transmit-to-receive and receive-to-transmit mode, no gaps in transmission would be required for time division duplex. However, the propagation time of the speed of light must be accounted for between separated base stations and subscriber stations.

In addition, base station and subscriber station equipment must be allowed time to switch from a transmitting mode to a receiving mode and vice versa. The timing gaps for time division duplex systems, such as WiMAX systems, are therefore used to account for the propagation time of the signal between the base station and the subscriber station as well as equipment switching times.

The WiMAX Forum release 1.0 approved a profile for a time division duplex frame with a single profile specified for the turn-around times. The turn-around time (timing gap) between the end of the down link frame and the start of the uplink frame, as measured at the base station, is referred to as the transmit transition gap (TTG) in the WiMAX standard. Likewise, the turn-around time between the end of the up link frame and the beginning of the downlink frame, as measured at the base station, is referred to as the receive transition gap (RTG) in the WiMAX standard.

In a distributed antenna system, 5 km of fiber would use up most of the delay budget allowed by the WiMAX profile, resulting in an over-the-air coverage radius of less than 1 km. Fibers of greater length would exceed the delay budget, making the system unusable.

SUMMARY

The present application relates to a method of scheduling time division duplex frames at a base station in a time division duplex system. The method of scheduling time division duplex frames includes determining that the round-trip propagation delay between the base station and a communicatively coupled subscriber station exceeds the difference between the base station turn-around time and the minimum allowed subscriber station turn-around time, and modifying time slots in a time division duplex frame being sent to the subscriber station over a communication link in order to extend the range of signals sent from the base station.

The present application also relates to a method of scheduling time division duplex frames at a base station of a time division duplex system in order to extend a range of a communication link to a subscriber station. The method includes recognizing a timing gap between the end of the downlink frame and the start of the uplink frame in a time division duplex frame is too short for the communication link to the subscriber station, and modifying time slots in a time division duplex frame being sent over a communication link to extend the range of signals sent from the base station, so that the range of the communication link to the subscriber station is extended without degradation of the communication link.

The present application also relates to a base station in a time division duplex system. The base station includes a time-slot scheduler communicatively coupled to receive time-slot-modification instructions from a processor. The base station also includes a base station antenna communicatively coupled to the base station and/or an optical fiber communicatively coupled to both the base station and a remote antenna. A range of signals propagating in the system is increased based on an implementation of the time-slot-modification instructions by the time-slot scheduler.

The present application also relates to a method of triggering a base station in a time division duplex system to modify time slots in a time division duplex frame being sent over a communication link to a subscriber station. The method includes sending a ranging burst to the base station from the subscriber station, and sending an advanced-timing ranging burst to the base station when the ranging burst is not recognized. The advanced-timing ranging burst is received at an appropriate time slot at the base station. The subscriber station is synchronized to the base station based on receiving the advanced-timing ranging burst at an appropriate time slot at the base station. The subscriber station recognizes that an unmodified timing gap between the end of the downlink frame and the start of the uplink frame in a time division duplex frame is too short for the communication link to the subscriber station when the subscriber station is synchronized to the base station. Then the subscriber station triggers the base station to modify time slots in a time division duplex frame being sent over the communication link, so that the range of signals sent from the base station to the subscriber station is extended.

The present application also relates to a computer readable medium encoded with instructions stored thereon for a method of scheduling time division duplex frames at a base station in a time division duplex system. The method includes determining that the round-trip propagation delay between the base station and a communicatively coupled subscriber station is greater than the difference between the base station turn-around time and the minimum allowed subscriber station turn-around time and modifying time slots in a time division duplex frame being sent to the subscriber station over a communication link to extend the range of signals sent from the base station.

The present application also relates to a computer readable medium encoded with instructions stored thereon for a method of triggering a base station in a time division duplex system to modify time slots in a time division duplex frame being sent over a communication link to a subscriber station. The method includes sending a ranging burst to the base station from the subscriber station, sending an advanced-timing ranging burst to the base station when the ranging burst is not recognized, and triggering the base station to modify time slots in a time division duplex frame being sent over the communication link based on the subscriber station being synchronized to the base station.

DRAWINGS

FIG. 2 is a block diagram indicating a time evolution of the turn-around time in an exemplary time division duplex frame as detected at various points of a prior art time division duplex system;

In accordance with common practice, the various described features are not drawn to scale but are drawn to emphasize features relevant to the present invention. Like reference characters denote like elements throughout figures and text.

DETAILED DESCRIPTION

Embodiments of the systems described herein are able to extend the range of time division duplex frames sent over air and/or sent over fibers to a distribution of remote antenna units while avoiding problems related to the additional round trip delay introduced by extending the length of the communication link. The various embodiments of the base station are configured to modify the time division duplex frames to provide a longer delay budget between the subscriber station and the base station. A longer delay budget between the subscriber station and the base station extends the range of signals transmitted from the base station over a communication link that includes a fiber link and/or a wireless link.

The techniques provided in this document provide ways to extend the range between the base station and a subscriber station communicatively coupled by an optical fiber. The techniques provided in this document provide ways to extend the range between the base station and a subscriber station communicatively coupled by fiber and a wireless communication link. Additionally, the techniques provided in this document provide a way to extend the range between the base station and a subscriber station communicatively coupled by a wireless communication link, thereby extending the range of purely over-the-air signals. One embodiment extends the range of purely over-the-air signals without losing bandwidth. This latter application is useful in rural locations where the distance between remote antenna units is large.

Figure 1A:
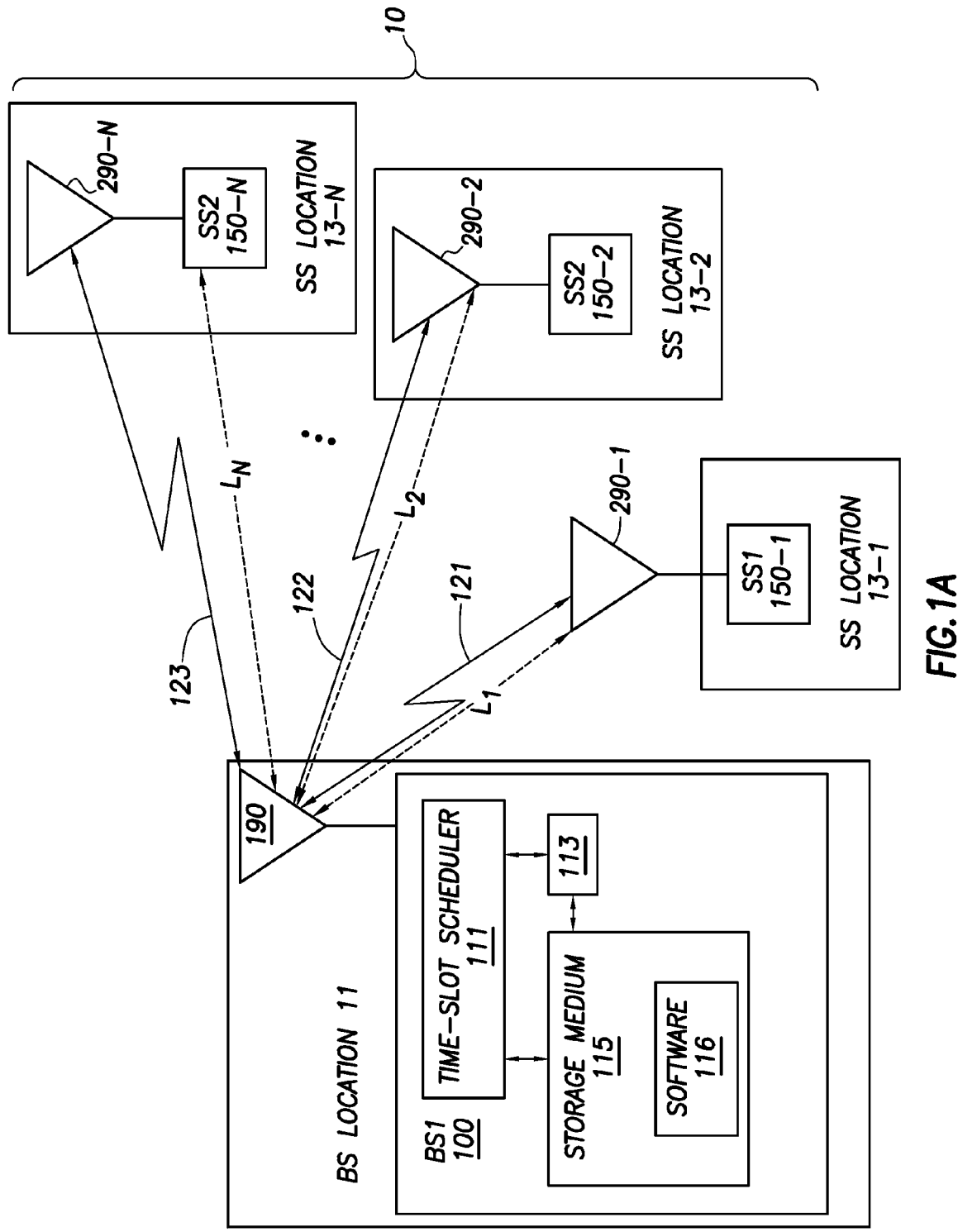
FIGS. 1A and 1B are block diagrams of time division duplex systems in accordance with the present invention.
Figure 1B:
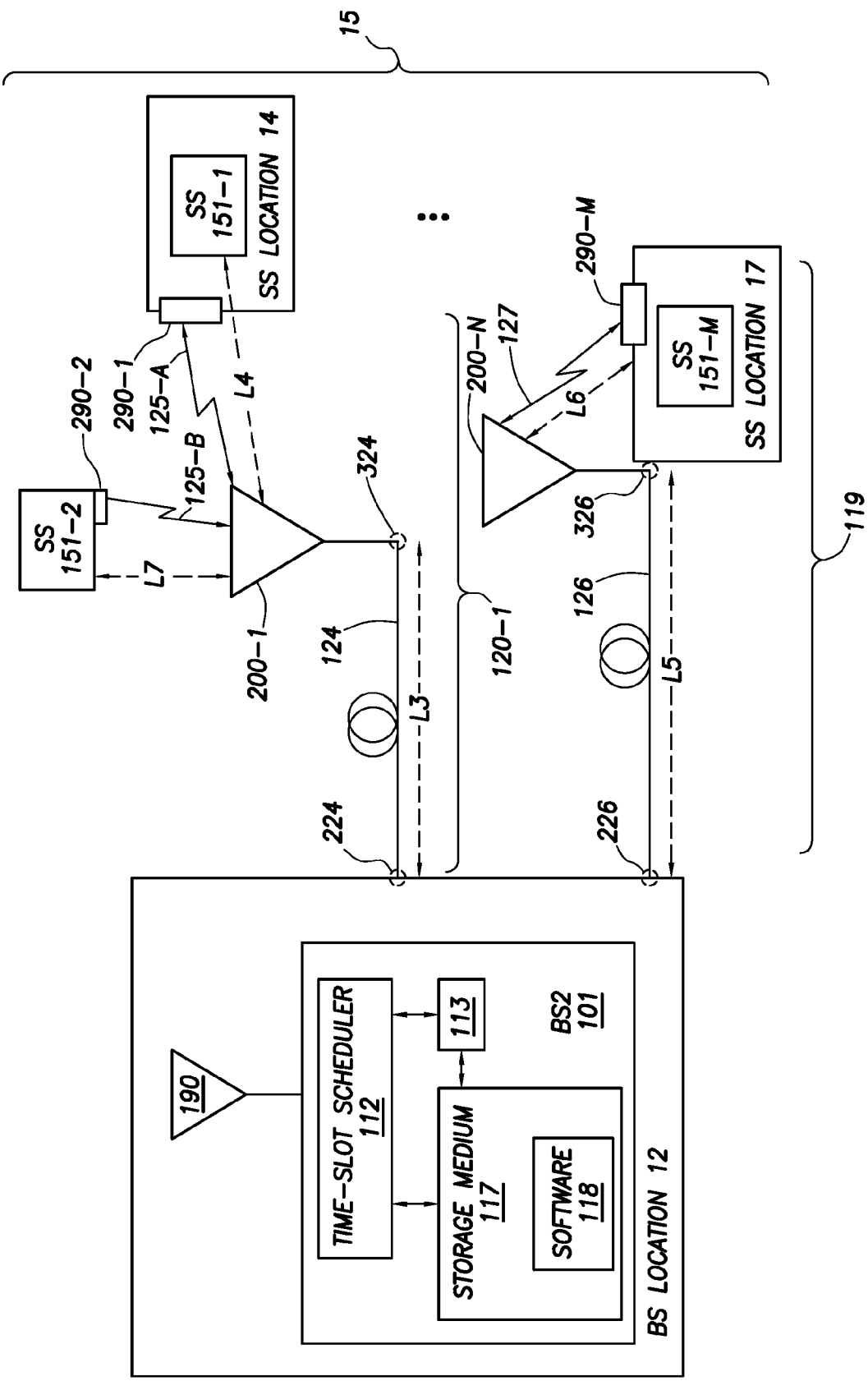

FIGS. 1A and 1B are block diagrams of time division duplex systems in accordance with the present invention. FIG. 1A is a block diagram of one embodiment of a time division duplex system 10 in which a base station (BS1) 100 is communicatively coupled to at least one subscriber station (SS) 150(1-N). The base station 100 is located at a base station (BS) location 11. Each of the subscriber stations 150 (1-N) are located at a respective remote location 13(1-N) that is remote from the base station location 11. For example, the distance $L_1$ between the base station 100 and the subscriber station 150-1, the distance $L_2$ between the base station 100 and the subscriber station 150-2, and the distance $L_3$ between the base station 100 and the subscriber station 150-3 is greater than the allowable distances in prior art time division duplex systems. In this case, the base station 100 implements methods, and computer readable media encoded with instructions stored thereon as described herein to allow the communication between the base station 100 and the subscriber station 150-2 and 150-N.

The base station 100 includes a time-slot scheduler 111 that communicatively coupled to receive time-slot-modification instructions from a processor 113. The processor 113 executes software 116 stored in a storage medium 115. The storage medium 115 is a computer readable medium encoded with instructions stored thereon (software 116) for a method of scheduling time division duplex frames at the base station 100 in the time division duplex system 10. The processor 113 triggers the time-slot scheduler 111 in the base station 100 to modify the time slots with the time-slot-modification instructions. The time-slot scheduler 111 is configured to adjust time slots in a time division duplex frame being sent over a communication links (e.g., communication links 121, 122, and 123) based on the receive time-slot-modification instructions. The range of signals sent from the base station 100 is increased based on the implementation of the time-slot-modification instructions by the time-slot scheduler 111. The various methods of scheduling time division duplex frames by modifying the time slots are described in detail below.

In the embodiment shown in FIG. 1A, each of the subscriber stations 150(1-N) is coupled to at least one subscriber antenna 290(1-N), respectively. For example, in some implementations, the $i^{th}$ subscriber antenna 290-$i$ is external to the respective $i^{th}$ subscriber station 150-$i$. In other implementations, the subscriber antenna 290-$i$ is integrated into the subscriber station 150-$i$ itself.

Each of the subscriber stations 150(1-N) is communicatively coupled to the base station 100 via a suitable communication link, such as communication links 121, 122, and 123, respectively. As shown in FIG. 1A, the communication links 121, 122, and 123 are wireless communication links (for example, microwave links, WIMAX communication links, extended WiMax communication links, universal mobile telecommunications system (UMTS) long term evolution (LTE) communication links communication links). In one implementation of this embodiment, the communication links 121, 122, and 123 are wired communication links (for example, twisted-pair cabling, CATV cabling, or coaxial cabling), in which case an $i^{th}$ subscriber station 150-$i$ that is wired to the base station 100 does not have an antenna 290-$i$.

In some embodiments, the subscriber stations 150(1-N) are communicatively coupled to the base station 100 via separate communication links that are implemented using separate physical media (for example, using separate point-to-point links implemented using twisted-pair cabling, CATV cabling, or coaxial cabling). In some embodiments, the subscriber stations 150(1-N) are communicatively coupled to the base station 100 using, at least in part, shared communication links (for example, a hybrid-fiber coax (HFC) infrastructure or a local or wide area network (such as an Internet Protocol (IP) network)). Also, in some embodiments, the subscriber stations 150(1-N) are coupled to the base station 100 via one or more intermediary devices (for example, one or more "expansion" units).

FIG. 1B is a block diagram of one embodiment of a time division duplex system 15 in which a base station (BS2) 101 is communicatively coupled to subscriber stations (SS) 151 (1-M). The time division duplex system 15 is an exemplary distributed antenna system. The base station 101 is communicatively coupled to the subscriber stations 151-1 and 151-2 by an optical fiber 124, a remote antenna 200-1, and subscriber station antennas 290-1 and 290-2, respectively. The base station 101 is communicatively coupled to the $m^{th}$ subscriber station 151-M by an optical fiber 126, a remote antenna 200-N, and a subscriber station antenna 290-M. The remote antennas 200(1-N) are also referred to herein as "remote antenna units 200(1-N)." For clarity of viewing, FIG. 1B, shows a one-to-one or a one-to-two correspondence between the remote antennas 200(1-N) and the subscriber stations 151 (1-M), however there can be many subscriber stations 290 associated with each remote antenna 200(1-N). In one implementation of this embodiment, there is no antenna 190 at the base station 101.

The base station 101 includes a time-slot scheduler 112 that communicatively coupled to receive time-slot-modification instructions from a processor 113. The processor 113 executes software 118 stored in a storage medium 117. The storage medium 117 is a computer readable medium encoded with instructions stored thereon (software 118) for a method of scheduling time division duplex frames at the base station 101 in the time division duplex system 15. The processor 113 triggers the time-slot scheduler 111 in the base station 101 to modify the time slots with the time-slot-modification instructions. The time-slot scheduler 112 is configured to adjust time slots in a time division duplex frame being sent over a communication links based on the receive time-slot-modification instructions. The range of signals sent from the base station 101 is increased based on the implementation of the time-slot-modification instructions by the time-slot scheduler 112.

The base station 101 is located at a base station (BS) location 12. The subscriber station 151-1 is located at a subscriber station (SS) location 14 that is remote from the base station location 12. The optical fiber 124 has an optical length of $nL_3$, where n is the effective index of the core of the optical fiber, and the remote antenna 200 has an over-the-air range of $L_4$ so the maximum physical distance between the base station 100 and the subscriber station 151 is $L_3+L_4$. The subscriber station 151-M is located at a subscriber station (SS) location 17 that is remote from the base station location 12. The optical fiber 126 has an optical length of $nL_5$ and the remote antenna 200-N has an over-the-air range of $L_6$ so the maximum physical distance between the base station 100 and the subscriber station 151-M is $L_5+L_6$. The total effective length of the communication link between the base station and subscriber station, $(nL_3+L_4)$, $(nL_3+L_7)$, or $(nL_5+L_6)$, is limited by the delay budget of the communication protocol profile. By implementing methods, systems, and computer readable media encoded with instructions stored thereon as described herein, the effective distances $(nL_3+L_4)$, $(nL_3+L_7)$, and $(nL_5+L_6)$ can be greater than the allowable propagation distances in prior art time division duplex systems.

In the embodiment shown in FIG. 1B, the remote antenna 200-1 receives the signal from the base station 101 after it propagates the length $L_3$ of the optical fiber 124. The remote antenna 200-1 emits the signal through the air to the subscriber stations 151-1 and 151-2 at locations that are at a distances $L_4$ and $L_7$, respectively, from the remote antenna 200-1. In this manner, the subscriber stations 151(1-2) are communicatively coupled to the remote antenna 200-1 via the wireless communication links 125-A and 125-B, respectively. Likewise, the remote antenna 200-N receives the signal from the base station 101 after it propagates the length $L_5$ of the optical fiber 126. The remote antenna 200-N emits the signal through the air to the subscriber station 151-M at a location that is at a distance $L_6$ from the remote antenna 200-N. In this manner, the subscriber station 151-M is communicatively coupled to the remote antenna 200-N via a wireless communication link 127.

In other implementations, the subscriber station is connected directly to the end of the optical fiber. In such a case, by implementing methods, systems, and computer readable media encoded with instructions stored thereon as described herein, the optical length of the optical fiber $nL_3$ can be greater than the allowable optical length of the optical fiber in prior art time division duplex systems. In some other implementations, the subscriber station 151-1 includes at least one integrated remote antenna (not shown) and includes an appropriate interface to communicatively couple the subscriber station 151-1 to the remote antenna 200-1, as is understandable to one skilled in the art upon reading this document.

As shown in FIG. 1B, the communication links 125-A, 125-B, and 127 are wireless communication links (for example, microwave links, WIMAX communication links, extended WiMax communication links, UMTS Long Term Evolution communication links). In one implementation of this embodiment, the communication links 125-A, 125-B, and/or 127 are a combination of a wired communication link and a wireless link.

In some embodiments, the subscriber stations 151(1-M) are communicatively coupled to the base station 101 via separate communication links that are implemented using separate physical media (for example, using separate point-to-point links implemented using optical fiber, twisted-pair cabling, CATV cabling, or coaxial cabling). In some embodiments, the subscriber station 151 is communicatively coupled to the base station 101 using, at least in part, shared communication links (for example, a hybrid-fiber coax (HFC) infrastructure or a local or wide area network (such as an Internet Protocol (IP) network)). Also, in some embodiments, the subscriber station 151-1 is coupled to the base station 101 via one or more intermediary devices (for example, one or more "expansion" units).

The base stations 100 and 101 in FIGS. 1A and 1B are also referred to here as "centralized units 100 and 101." In one implementation of this embodiment, the base station 100 and 101 include host units (also referred to herein as "hub units"). The subscriber stations 150(1-N) and 151 (1-M) are also referred to herein as "subscriber units 150(1-N) and 151(1-M)." In another implementation of this embodiment, the antennas 200(1-N) are communicatively coupled to remote radio heads (also referred to herein as "remote radio units").

As shown in FIG. 1B, the fiber 124 includes a base-station end represented generally at 224 and a remote-antenna-end represented generally at 324. Likewise, the fiber 126 includes a base-station end represented generally at 226 and a subscriber-remote-antenna represented generally at 326. In an embodiment in which the base station 101 includes host units, the host units (not shown) are attached to the fibers 124 and 126 at the base-station ends 224 and 226, respectively. In some of these latter embodiments, the antennas 200-1 and 200-N are communicatively coupled to remote radio heads (not shown), which are attached to the remote-antenna-ends 324 and 326 of the respective fibers 124 and 126.

FIG. 2 is a block diagram indicating a time evolution of the turn-around times in an exemplary time division duplex frame of a prior art time division duplex system. The time division duplex frames 450-454 each extend for the duration of one transmit and one receive burst. The exemplary time division duplex frame 450 sent from and received at the base station is shown in the first row of FIG. 2. In time division duplex frames 451-454, the effective time gaps are shown as they would be detected by equipment at the end of different length communication links. The effective time gaps change based on the length of the communication link. As shown in FIG. 2, the time division duplex frames 451-454 are aligned in rows below time division duplex frame 450 for a clear view of the relationship of the effective time gaps for sequentially increasing lengths of communication links. In the time division duplex frames 451-454, each symbol in each sequential time division duplex frame is offset from the respective symbol in the preceding time division duplex frame due to the difference in propagation delay of the signals.

As described above, time division duplex systems 10 and 15 require that neither the base station nor the subscriber station transmit signals while receiving signals. The symbols (also referred to herein as time slots) represented generally at 370 that form a downlink portion 460 of the time division duplex frame 450 are sent from a base station ((1) BS transmits) in the time division duplex frame 450 and are received at a subscriber station ((2) SS receives). The symbols (time slots) represented generally at 380 that form an uplink portion 470 of the time division duplex frame 450 are received at the base station ((4) BS receives) from the subscriber station ((3) SS transmits). The uplink portion 470 is also referred to as uplink frame 470. The downlink portion 460 is also referred to herein as the downlink frame 460.

The time division duplex frame 451 shows the timing for receipt of symbols 370 in the downlink portion 460 received at a subscriber station located at the end of a 2.97 km optical fiber. The time division duplex frame 452 shows the timing of symbols 370 in the downlink portion 460 received at a subscriber station located 0.38 km from the end of a 2.97 km optical fiber. The time division duplex frame 453 shows the timing of symbols 370 in the downlink portion 460 received at a subscriber station located 0.75 km from the end of a 2.97 km optical fiber. The time division duplex frame 454 shows the timing of symbols 370 in the downlink portion 460 received at a subscriber station located 1.5 km from the end of a 2.97 km optical fiber.

The subscriber station transmits based on instructions (i.e., from the 'MAP') in the received in the downlink portion 460 of the time division duplex frame 450, 451, 452, 453, or 454. The resulting subscriber station transmission is in the uplink portion 470 of the same frame 450, 451, 452, 453, or 454, respectively. As described above for prior art systems, there must be a gap in the frame 454 (at the subscriber station located 1.5 km from the end of a 2.97 km optical fiber) that is equal to or greater than the minimum receive-to-transmit turnaround time of the subscriber station. This requires that the gap at the base station location in frame 450 be equal to or greater than the minimum receive-to-transmit turnaround time of the subscriber station plus the round trip propagation delay from the base station to the subscriber station. This is because the subscriber station must wait until the last symbol 370-Z is received from the base station prior to transmitting. From the base station viewpoint, no signal can be received during the time that it takes a signal (traveling at the speed of light over the air or in fiber, depending on medium) to go out to the subscriber station and back.

An exemplary time delay due to signal propagation in a communication link is shown as a timing offset $\Delta t$ between the first symbol 370-A in the time division duplex frame 454 and the time division duplex frame 450. The first symbol 370-A in the time division duplex frame 454 is offset in time from the first symbol 370-A in the time division duplex frame 450 by the timing offset $\Delta t$ since the first symbol 370-A in the time division duplex frame 454 was detected after being sent from the base station and propagating over a 2.79 km long optical fiber with a subsequent over-the-air propagation distance of 1.5 km.

As shown in FIG. 2, a turn-around time 350 (also referred to herein as "second turn-around time 350," "second timing gap 350," or "timing gap (TTG) 350") is between the end of the downlink portion 460 and the beginning of the uplink portion 470 in the time division duplex frames 450-454. A turn-around time 360 (also referred to herein as "first turn-around time 360," "first timing gap 360," or "timing gap (RTG) 360") is between the end of the uplink portion 470 and the beginning of the downlink portion 460 in the time division duplex frame 450.

The time division duplex frames 450-454 each include the downlink portion 460, the second timing gap 350, the uplink portion 470, and the first timing gap 360. The duration of the second timing gap 350 in the time division duplex frame 454 is referred to herein as the timing gap (TTG) 395-A. The timing gap 395-A (in time division duplex frame 454) is shorter in duration than the timing gap 350 (in the time division duplex frame 450) by twice the timing offset Δt because the down link frame 460 arrives Δt late, and the uplink frame 470 has to be transmitted Δt early (effectively subtracting Δt from each end of 395-A). In the prior art time division duplex systems, the maximum propagation length of the communication link between the base station and the subscriber station is limited by the duration of the timing gap 395-A. In prior art time division duplex systems, when the duration of timing gap 395-A equals the turn-around time of the subscriber station, the communication link cannot be extended any further in length.

The timing gaps 350 in the time division duplex frames 451-454 are shown in FIG. 2 as virtual second timing gaps represented generally at 395 or effective second timing gaps 395, since they are each reduced in duration from the timing gap 350 in the time division duplex frame 450.

The second timing gap 350, such as the timing gap 395-A in the time division duplex frame 454, ends when the first symbol 380-A is sent from the subscriber station. The time division duplex systems are configured so the first symbol 380-A sent from the subscriber station arrives at the base station at the end of the second timing gap 350 in time division duplex frame 450. As described above, the propagation delay time of communication link is the timing offset Δt.

The first symbol 380-A is uplinked from the subscriber station 151 located 1.5 km from the end of a 2.97 km optical fiber and is received at the base station 101 after the propagation delay of Δt. Since the first symbol 380-A is sent from the subscriber station 151 a time Δt before the receipt at the base station 101, the last symbol 380-Z is also sent a time Δt before the receipt of the last symbol 380-Z at the base station 101. Thus, the first timing gap (RTG) 390-A in the time division duplex frame 454 is wider by 2Δt than the first timing gap (RTG) 360 in the time division duplex frame 450. This is because Δt is added to both ends of RTG at 454.

The timing gaps 360 in the time division duplex frames 451-454 are shown in FIG. 2 as virtual second timing gaps represented generally at 390 or effective first timing gaps 390, since they are each increased in duration from the timing gap 360 in the time division duplex frame 450. Thus, as is seen in FIG. 2, as the length of the communication link increases, the duration of the effective second timing gaps 395 decreases and the duration of the effective first timing gaps 390 increases.

In one implementation of this embodiment, the prior art time division duplex system is a WiMAX system. The discussion of FIG. 2 is made now with reference to a WiMAX system, although it is to be understood that the embodiments of methods and systems described herein can be applied to other time division duplex systems. The following profiles and required timing gaps that are defined in the specifications by the Wave 2 WiMAX forum are referenced in the following discussion of FIG. 2:

Sampling frequency (Fs)=bandwidth (BW)*(28/25)=$10^7$*(28/25)=11.2 Msps;
Symbol Period=720/7=102.857 μs;
Physical Slot (PS)=4/Fs=0.35714 μs;
Transmit Transition Gap (TTG)=296 PS=105.714 μs;
Receive Transition Gap (RTG)=168 PS=60 μs;
Subscriber Station Transmit Turnaround Gap (SSTTG)=50 μs; and
Subscriber Station Receive Turnaround Gap (SSRTG)=50 μs.

In one embodiment of a WiMAX time division duplex frame there are 47 symbols, with 29 symbols in the downlink portion 460 and 18 symbols in the uplink portion 470. The duration of such a time division duplex frame 450 is 5 ms. In FIG. 2, only an exemplary portion of the symbols 370 and 380 are shown.

During the time that the base station is transmitting-symbols 370 in the downlink portion 460, the subscriber station is receiving the symbols 370. Once the subscriber station has received all the symbols in the downlink portion 460, the subscriber station switches from receiving to transmitting. The time required for the subscriber station to switch from receiving to transmitting is referred to as the subscriber station receive turnaround gap (SSRTG). WiMAX profiles require the system to handle SSRTG values of up to 50 μs.

The base station schedules the start of the uplink frame 470 to arrive precisely at the end of the transmit transition gap 350, which starts after the end of the downlink frame 460. To do this, the round trip delay plus the subscriber station receive turnaround gap (SSRTG) must be less than transmit transition gap 350. Therefore the maximum round trip delay equals TTG-SSRTG=105.7 μs–50 μs=55.7 μs.

Thus, the maximum fiber distance for a prior art WiMAX system is 5.57 km (10 μs/km round trip delay) without any over-the-air range available or any allowance for equipment delay. Any over-the-air round trip delay or equipment delay must be subtracted from the 55.7 μs. Therefore, 4 km is a more realistic fiber limit allowing an air interface range of 2 km.

The resulting distance limit for a distributed antenna system with the Wave 2 WiMAX forum profile is restrictive and inadequate for rural applications. As can be seen from the FIG. 2, the transmit transition gap 350 is the gap that limits the range of signals in the WiMAX system. The present document describes solutions to this range limitation in which the transmit transition gap 350 is increased.

Figure 9:
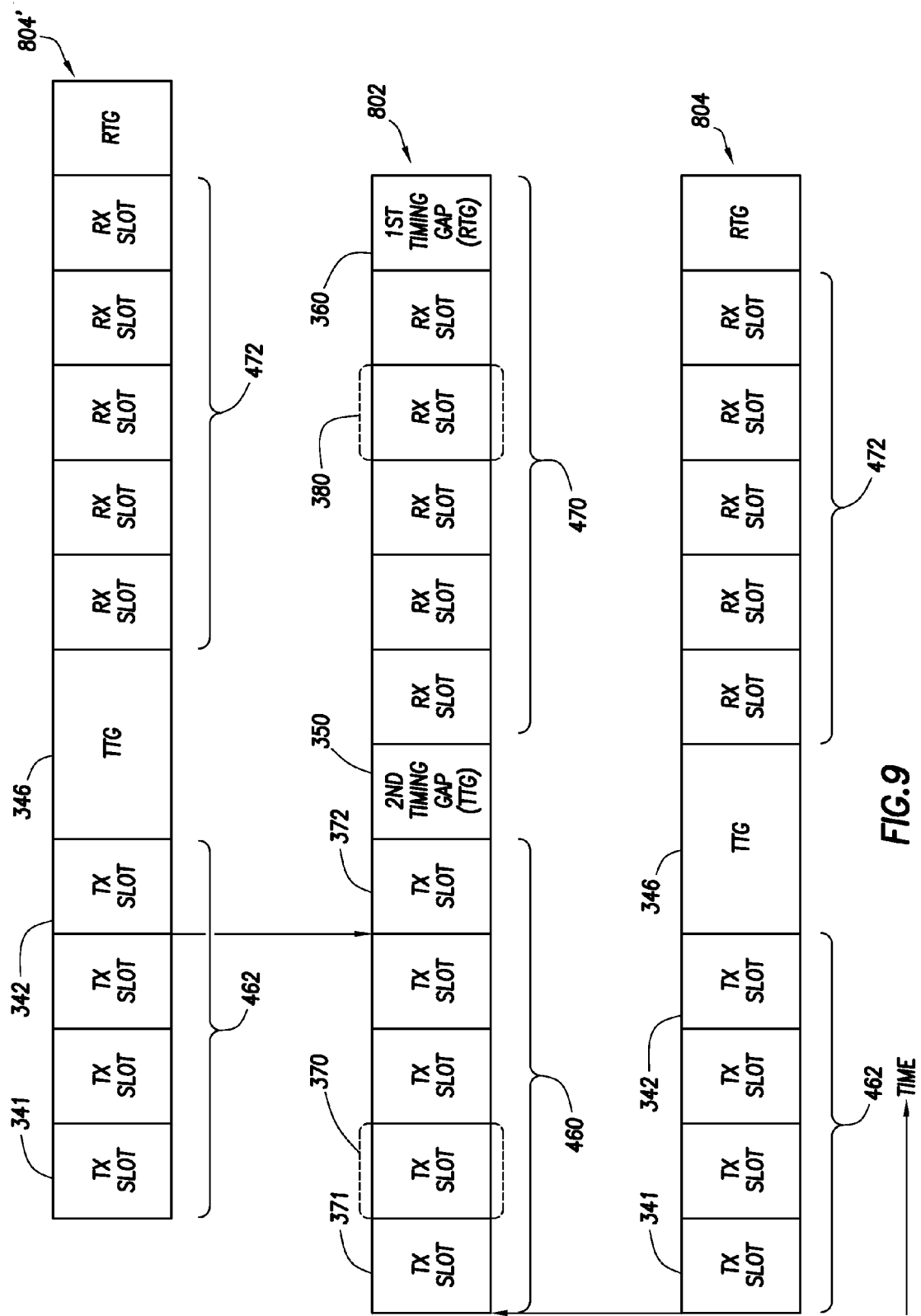
FIG. 9 shows exemplary time division duplex frames in two possible alignment configurations.

FIGS. 3-5, 7, and 10 show methods of determining a propagation delay between the base station and a communicatively coupled subscriber station and of scheduling time division duplex frames at a base station in a time division duplex system in order to extend the range of communication links. FIGS. 6A, 9, and 11A show exemplary time division duplex frames. FIGS. 6B, 9, and 11B show modifications to the exemplary time division duplex frames of FIGS. 6A, 9, and 11A, respectively, according to the methods described herein. The modified time-division-duplex frame is sent from a base station for receipt at a subscriber station that is located beyond the current restricted propagation distance.

FIGS. 3-11B are described with reference to the time division duplex systems 10 and 15 of FIGS. 1A and 1B although it is to be understood that other time division duplex system configurations can be used to implement the described methods.

The methods of scheduling time division duplex frames 450 at a base station 100 in a time division duplex system, such as time division duplex systems 10 and 15 include determining whether the round-trip propagation delay between the base station 100 and a communicatively coupled subscriber station 150 is greater than maximum allowed round-trip delay (determined by turn-around time 350 minus the allowed subscriber turn-around time). If the round-trip propagation delay between the base station 100 and a communicatively coupled subscriber station 150 is less than the difference between the base station turn-around time and the minimum allowed subscriber station turn-around time, the time division duplex frame is sent from the base station 100 without modification according to one of the methods described herein. As defined herein, the minimum allowed subscriber station turn-around time is the smallest subscriber station turn-around time permitted by the propagation delay in the communication link of a time division duplex system when the techniques described herein are not implemented.

Figure 3:
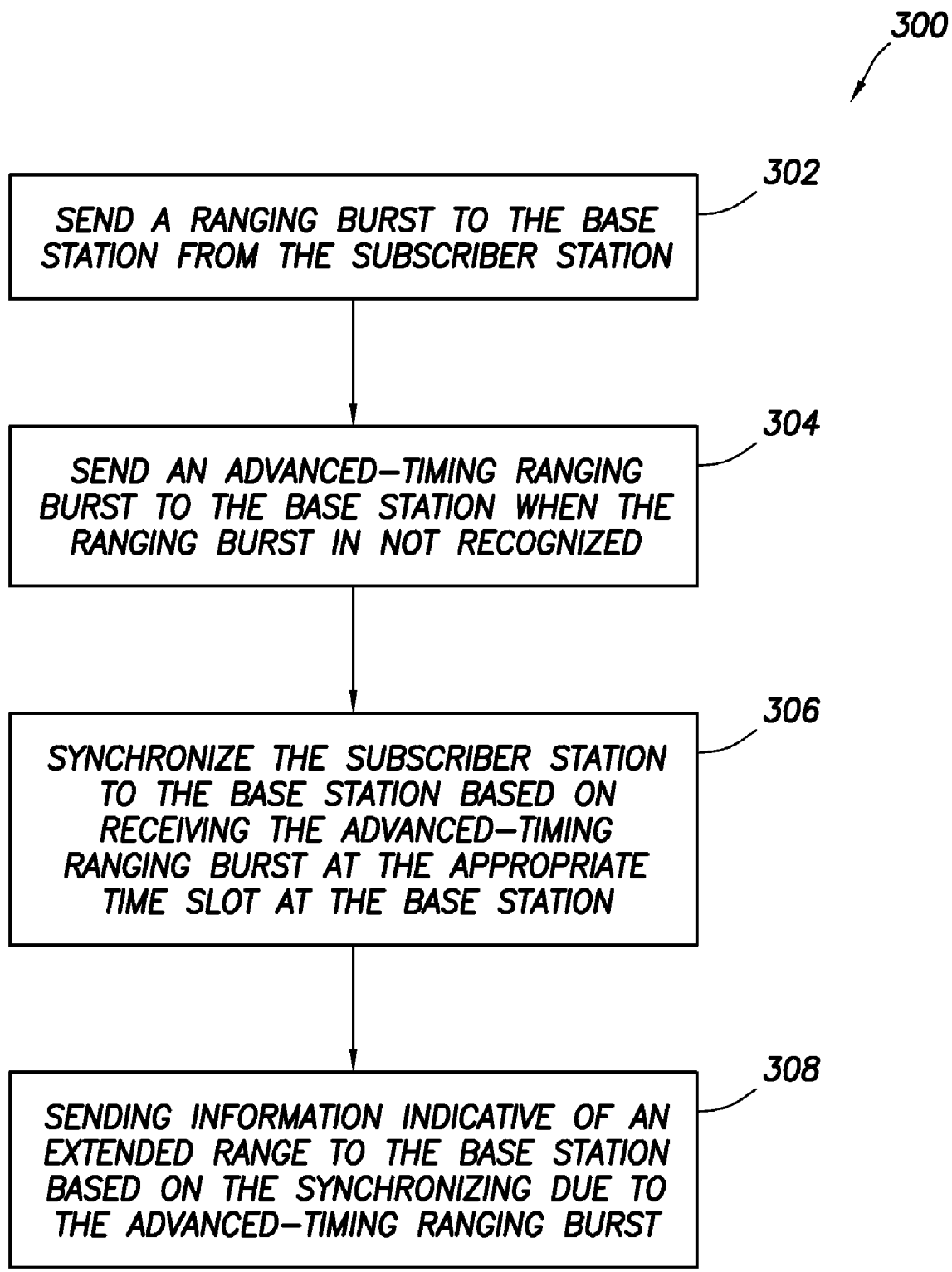
FIG. 3 is a flow diagram of a method of determining if the round-trip propagation delay between the base station and a communicatively coupled subscriber station is greater than the difference between the base station turn-around time and the minimum allowed subscriber station turn-around time.

FIG. 3 is a flow diagram of a method 300 of determining if a round-trip propagation delay between the base station 100 and a communicatively coupled subscriber station 150 is greater than the difference between the base station turn-around time and the minimum allowed subscriber station turn-around time. This process adjusts the conventional ranging process, which is used to establish a communication link between a subscriber and a base station that are within a conventional range. Method 300 is described with reference to base station 100 and subscriber station 150 shown in FIG. 1A.

At block 302, a ranging burst is sent to the base station 100 from the subscriber station 150. The base station 100 has two or more time slots (e.g., X-slots where X is an integer) allotted for receiving (listening for) ranging bursts from any subscriber station 150 that is attempting to set up a communication link with the base station 100. The ranging burst of one or more time slots (e.g., Y-slots, where Y is an integer and Y<X) fits within this X-slot listening window when the subscriber station 150 is within the maximum conventional range of the base station 100. In a conventional WiMAX time division duplex system, the listening window is three symbols long, the ranging burst is two OFDM symbols long, each symbol is 103 μs, and maximum range of the base station 100 is 10 km (in optical fiber). The one symbol of slop in the conventional WiMAX system allows for the propagation delay of a 10 km long optical fiber, since light travels approximately 10 km in fiber in 103 μs.

The ranging burst is sent from subscriber station 150, which initially assumes it is right next to the base station 100. If the subscriber station 150 is located right next to the base station 100, the ranging burst is received at the beginning of the X-slot listening window of the base station 100. If the subscriber station 150 is located the maximum distance (e.g., 5 km) from the base station 100, the ranging burst is received at the end of the X-slot listening window of the base station 100. In conventional time division duplex systems, if the subscriber station 150 is beyond the maximum distance limit, the ranging burst does not fit within the X-slot listening window of the base station 100 and, the base station 100 will not recognize the input from the subscriber station 150.

The subscriber station 150 recognizes that base station 100 is not recognizing the ranging burst if a ranging response is not sent back to the subscriber station 150. There are multiple reasons for which a ranging response is not sent from the base station 100. First, another subscriber station may be ranging in the same sub-channels and using the same CDMA codes at the same time and contending with the ranging burst from the subscriber station. The probability of contention is reduced when code division multiple access (CDMA) ranging codes are impressed on the burst (125 codes), since it is highly unlike other subscriber station uses same sub-channels and the same code at the same time. A second reason could be that foreign noise from an RF source interferes with the burst. A third reason could be the burst is at too low power for the base station to recognize the burst due to high path loss. The reason which is germane to this invention is that the subscriber station 150 is too far away from the base station 100 as described above and the burst does not fit in the ranging window.

At block 304, after any power adjustments, the subscriber station 150 sends an advanced-timing ranging burst to the base station 100 when the ranging burst is not recognized (i.e., when a ranging response is not received at the subscriber station 150 from the base station 100). As defined herein, an advanced-timing ranging burst is a ranging burst that is sent earlier than a conventional ranging burst. By sending the advanced-timing ranging burst before the usual time, the pulse arrives within the X-slot listening window of the base station 100 even though the advanced-timing ranging burst has been delayed by more than the maximum propagation delay for the conventional maximum distance between the base station 100 and the subscriber station 150. Thus, the subscriber station 150 sends the Y-slot symbols ranging burst at a time to adjust for more than a maximum distance propagation delay so that the Y-slot symbols arrive within the X-slot listening window of the base station 100. The advanced-timing ranging burst is received at the base station 100 within the X-slot listening window.

At block 306, the subscriber station 150 is synchronized to the base station 100 based on the base station 100 receiving the advanced-timing ranging burst at an appropriate time slot (i.e., within the X-slot listening window). When the subscriber station 150 is synchronized to the base station 100 after sending advanced-timing ranging burst, the subscriber station 150 recognizes that it is synchronized to communicate with a base station 100 that is located beyond the conventional range. In one implementation of this embodiment, the processor 113 in the base station 100 or 101 is configured to recognize that the base station 100 or 101 is synchronized to communicate with a base station 100 that is located beyond the conventional range. At block 308, the subscriber station 150 then sends information indicative of an extended range to the base station 100 based on the synchronizing that occurred due to the advanced-timing ranging burst. The base station 100 determines the subscriber station 150 is at an extended range by querying the subscriber station 150 for the amount of delay the subscriber station 150 was required to add. This can be done autonomously and/or by a command from the base station 100. When the base station 100 receives information indicative of an extended range to the subscriber station 150, the base station 100 modifies time slots in the time division duplex frames sent to the subscriber station 150 located beyond the conventional range from the base station 100. In one implementation of this embodiment, the processor 113 sends time-slot-modification instructions to the time-slot scheduler 111.

Figure 4:
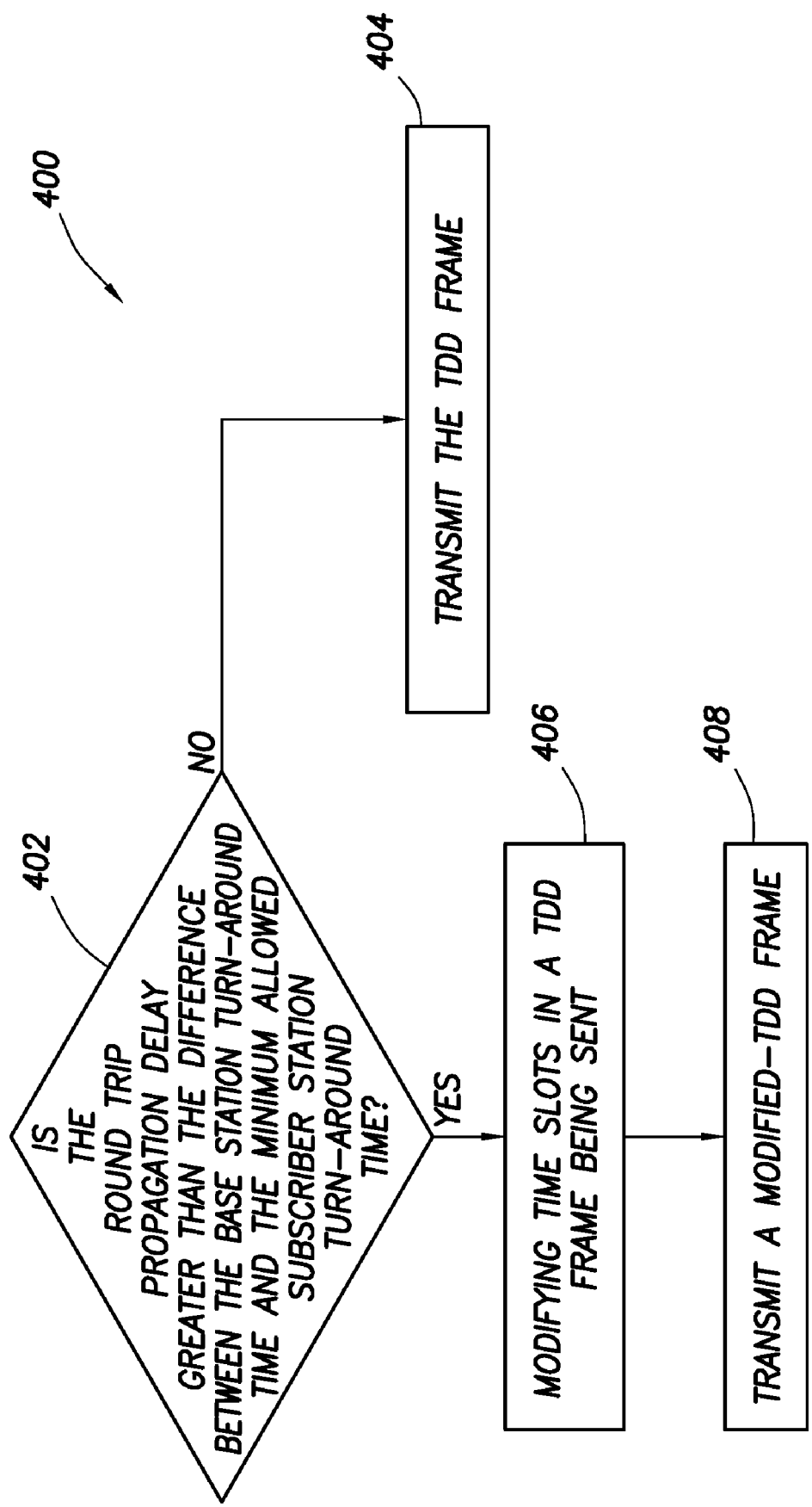
FIG. 4 is a flow diagram of a method of scheduling time division duplex frames at a base station in accordance with the present invention.

FIG. 4 is a flow diagram of a method 400 of scheduling time division duplex frames at a base station in a time division duplex system to extend a range of communication links having optical fiber in accordance with the present invention. In one implementation of this embodiment, the time division duplex system is a distributed antenna system. Method 400 is described with reference to FIGS. 1A, 1B and 2.

At block 402, a base station, such as base station 100 or 101, determines if the round-trip propagation delay between the base station and a communicatively coupled subscriber station, such as subscriber station 150-$i$ or 151-$j$, is greater than the difference between the base station turn-around time and the minimum allowed subscriber station turn-around time. The subscriber station 150-$i$ is the $i^{th}$ subscriber station 150 and the subscriber station 151-$j$ is the $j^{th}$ subscriber station 151. The method 300 to determine if the round-trip propagation delay is greater than the difference between the base station turn-around time and the minimum allowed subscriber station turn-around time was described above with reference to FIG. 3. In one implementation of this embodiment, the base station is communicatively coupled to the subscriber station via communication link 121, 122, or 123, shown in FIG. 1A. In another implementation of this embodiment, the base station is communicatively coupled to the subscriber station via the optical fibers 124 or 126 shown in FIG. 1B. In embodiments, at least part of the propagation delay is due to an over-the-air delay time. For example, the propagation delay can be due to the propagation delay in the communication link 120-1, which includes an optical fiber 124 having a length $L_3$ and a wireless communication link 125-A that extends a distance $L_4$ from the remote antenna 200-1 to the subscriber station 151-1 at the subscriber station location 14.

If the round-trip propagation delay is less than the difference between the base station turn-around time and the minimum allowed subscriber station turn-around time, the flow proceeds to block 404. At block 404, the base station 101 transmits the time division duplex frame 450 without any modification to the time slots 370.

If the round-trip propagation delay is greater than the difference between the base station turn-around time and the minimum allowed subscriber station turn-around time, the flow proceeds to block 406. At block 406, the time slots 370 in a time division duplex frame 450 being sent to the subscriber station 150 or 151 are modified to extend the range of signals sent from the base station 100 or 101, respectively. The terms "time slot" and "symbol" are used interchangeably, herein. The time slots 370 in a time division duplex frame 450 being sent to the subscriber station 151 are modified to extend the range of signals sent from the base station 101 via the optical fiber 124 in the manner described below with reference to method 500 of FIG. 5, method 700 of FIG. 7, or method 1000 of FIG. 10. At block 408, the modified-time-division-duplex frame is transmitted over the communication link.

Figure 5:
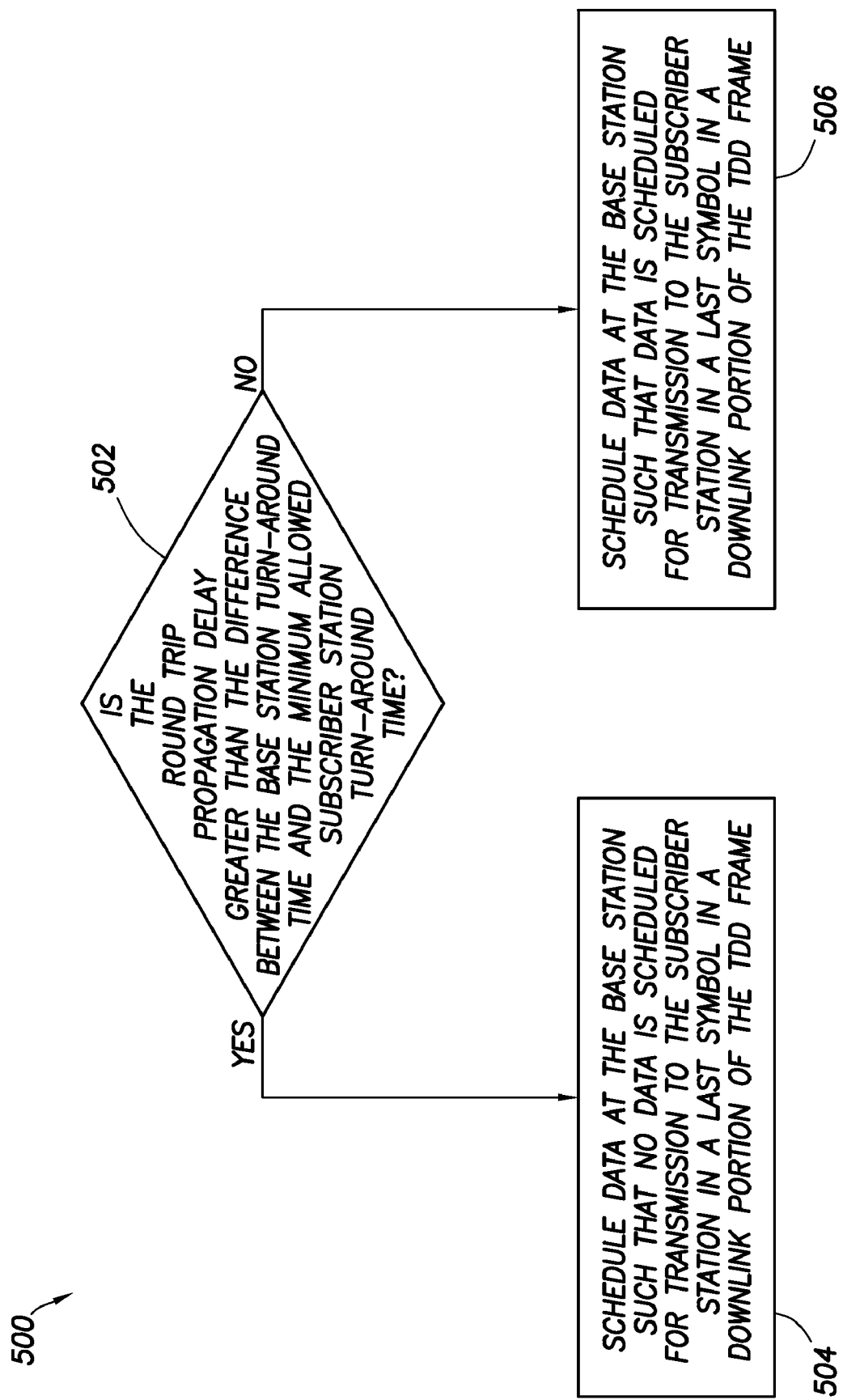
FIG. 5 is a flow diagram of a method of modifying time slots in a time division duplex frame being sent to a subscriber station over a communication link in accordance with the present invention.
Figure 6:
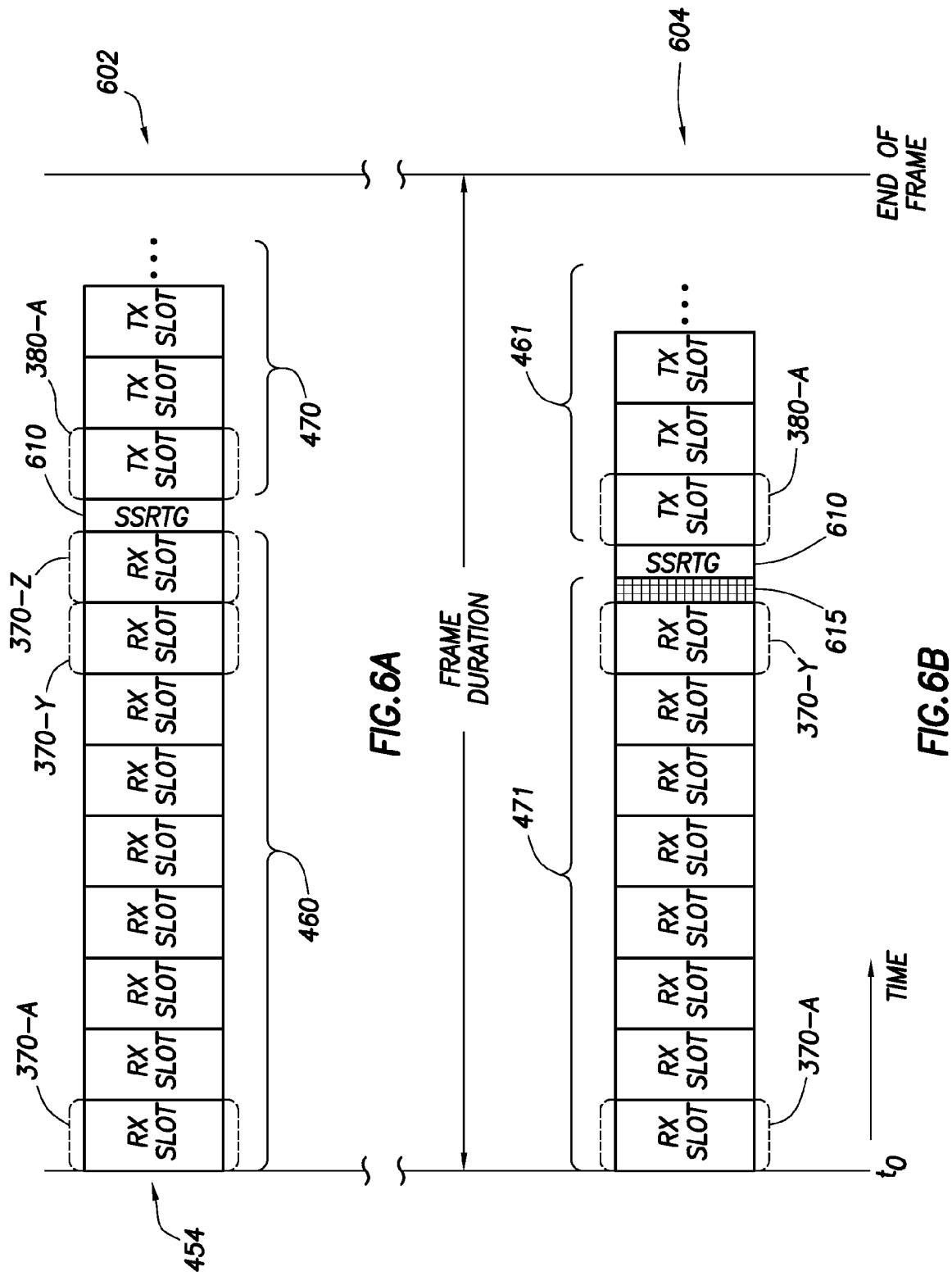
FIG. 6A is a portion of an exemplary time division duplex frame.
FIG. 6B is the portion of the exemplary time division duplex frame of FIG. 6A modified according to the method of FIG. 5.

FIG. 5 is a flow diagram of a method 500 of modifying time slots in a time division duplex frame being sent to a subscriber station over a communication link in accordance with the present invention. FIG. 6A is a portion of an exemplary time division duplex frame 602. FIG. 6B is a portion of the exemplary time division duplex frame 604 of FIG. 6A modified according to the method of FIG. 5. As shown in FIG. 6A, the unmodified-time-division-duplex frame 602 is seen from a specific subscriber station viewpoint, i.e., the downlink data is being received at the subscriber station and is therefore labeled "rx slot" in the downlink portion 460 and the uplink data is being sent from the subscriber station and is labeled "tx slot" in the uplink portion 470. The time division duplex frame 602 is modified according to method 500 to create modified-time-division-duplex frame 604 shown in FIG. 6B at the specific subscriber station. Method 500 is applicable to both the time division duplex systems 10 and 15 of FIGS. 1A and 1B, respectively. The symbol 380-A is reserved for ranging in WiMAX.

Referring now to FIG. 5, at block 502 it is determined if the round-trip propagation delay is greater than the difference between the base station turn-around time and the minimum allowed subscriber station turn-around time. If the round-trip propagation delay is greater than the difference between the base station turn-around time and the minimum allowed subscriber station turn-around time, then (at block 504) the base station schedules data such that no data is scheduled for transmission to a subscriber station (referred to herein as first subscriber station) in a last symbol 615 in a downlink portion 471 of the time division duplex frame 604.

For example, the base station 100 or 101 schedules data for transmission to the subscriber station 150 or 151, respectively, so that no data is transmitted in the last downlink symbol 370-Z (FIG. 6A) in the downlink portion 460 of the time division duplex frame 602 to the first subscriber station. As shown in FIG. 6B, when no data is scheduled in the last time slot 370-Z, the time slot is referred to as time slot 615 or symbol 615. In this case, the last time slot to carry data is the time slot 370-Y. In each time division duplex frame 602, the subscriber station 150 or 151 receives map data for the time division duplex frame 602 (or 604) that immediately follows. Thus, the subscriber station 150 or 151 has a whole frame to process the map data.

When the subscriber station 150 or 151 knows there is no data in the last symbol 615, (i.e., when the subscriber station 150 or 151 knows the next received time division duplex frame will be modified time division duplex frame 604) the subscriber station 150 or 151 prepares to start sending uplink symbols 380 immediately after the last symbol 370-Y with data is received, and before the end of the downlink portion 471 of the time division duplex frame 604 (FIG. 6B). When the symbol 615 sent without data would be received, the subscriber station 150 or 151 completes the turn-around to prepare to send data so the data is transmitted to the base station 100 up to one symbol earlier. In one implementation of this embodiment, the base station 100 schedules data for transmission to the subscriber station 150 or 151 so that no data is transmitted in the last two or more symbols in the downlink portion 460 of the time division duplex frame 602.

If it is determined at block 502 that the round-trip propagation delay is less than the difference between the base station turn-around time and the minimum allowed subscriber station turn-around time the flow proceeds to block 506. At block 506, the base station schedules data such that data is scheduled for transmission to the subscriber station (referred to herein as the second subscriber station) in the last symbol 615 in the downlink portion 460 of the time division duplex frame 602 responsive to determining the propagation delay between the base station and the communicatively coupled second subscriber station is less than the turn-around time 395-A (FIG. 2) (also referred to herein as "SSRTG 610").

When method 500 is implemented, the subscriber station trusts the base station and transmits when the base station requires. However, if the base station does not schedule data to the subscriber station on the last symbol or symbols, the base station must not require the subscriber station to measure channel quality on the last symbol(s). In yet another implementation of this embodiment, SSRTG may be reduced from 50 μs if subscriber stations permit. Each subscriber station 'announces' the SSRTG it requires (up to 50 us) to the base station when network entry occurs. If the SSRTG is less than the maximum, then the range may be extended.

In one implementation of this embodiment, if the round trip delay is long enough, the base station schedules data for the distant subscribers earlier in the down link frame (e.g., not in the last symbol or symbol pair) such that the distant subscriber station in a WiMAX system may transmit prior to SSRTG from the end of the down link frame but not prior to SSRTG from the end of the down link bursts intended for the subscriber station. This would allow the same 10 km (and more) extensions that the formal symbol deletion approach would allow, if the subscriber stations follow the base station instructions. Note that a subscriber station may allow transmissions less than SSRTG from the end of the down link frame while not allowing transmissions from the subscriber station to actually fall within the down link frame. In this case, the maximum improvement in range will be equal to that allowed by elimination of SSRTG, 50 μs which is 5 km of additional fiber.

SSRTG is defined by the WiMAX forum as a maximum of 50 μs. Nothing precludes subscriber stations with faster turn-around times than 50 μs. In one implementation of this embodiment, the SSRTG is reduced to less than 50 μs. For each 10 μs reduction in SSRTG, a kilometer of additional fiber is allowed. However an additional 40 μs is the maximum that could be expected with this approach. Such an embodiment does not require deletion of any symbols. The subscriber station announces the SSRTG. The subscriber station (also referred to as a mobile station) can gain network entry at 10 km distance of fiber whereas the mobile station is not able to receive the last symbol while transmitting on the first symbol, assuming the base station does not have the ability of selective 'last symbol' scheduling. The base station does not allow the entry of mobile stations that can range but that can not utilize resources properly. The maximum distance in which the mobile station can utilize all symbols is dependent upon the SSRTG of that mobile station and the base station takes this into account when allowing network entry.

Figure 7:
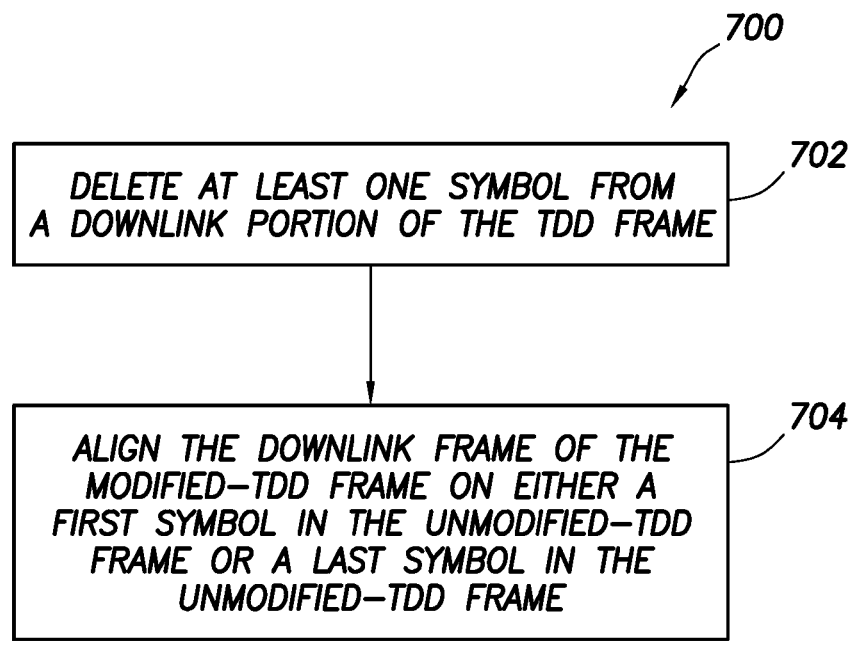
FIG. 7 is a flow diagram of a method of modifying time slots in a time division duplex frame being sent to a subscriber station over a communication link in accordance with the present invention.
Figure 8:
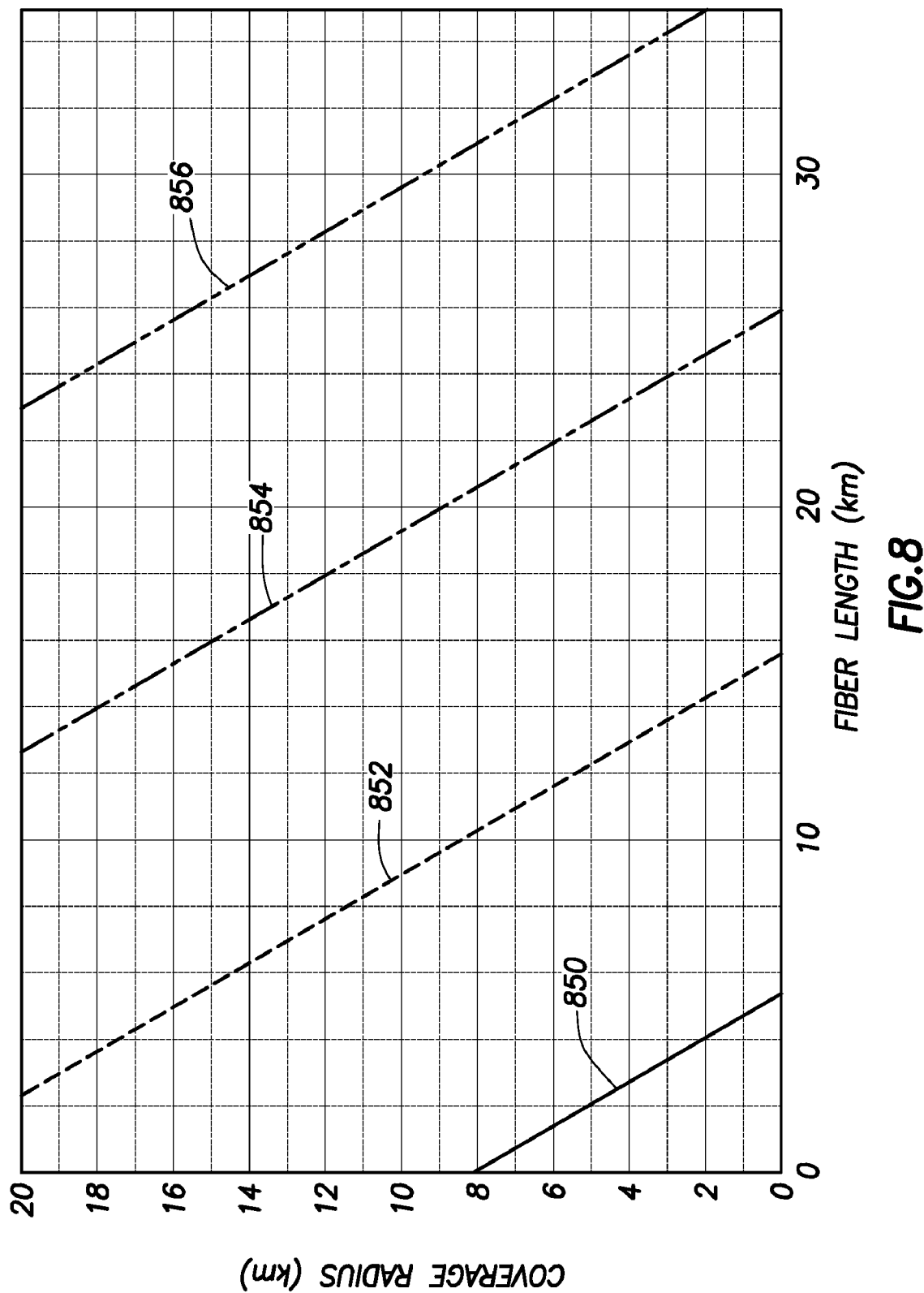
FIG. 8 is chart showing the maximum fiber length of a distributed antenna system as a function of the coverage radius and number of symbols deleted from a time division duplex frame.

FIG. 7 is a flow diagram of a method 700 of modifying time slots in a time division duplex frame being sent to a subscriber station over a communication link in accordance with the present invention. FIG. 8 is chart showing the maximum fiber length of a distributed antenna system as a function of the coverage radius and number of symbols deleted from a time division duplex frame. FIG. 9 shows exemplary time division duplex frames 802 and 804 in two possible alignment configurations. The time division duplex frame 802 is modified according to the method 700 of FIG. 7 to form the modified-time-division-duplex frame 804, which is shown in one of the two alignment configurations as modified-time-division-duplex frame 804'. Method 700 is applicable to both the time division duplex systems 10 and 15 of FIGS. 1A and 1B, respectively.

At block 702, at least one symbol is deleted from a downlink portion of the time division duplex frame to form a modified-time-division-duplex frame. As shown in FIG. 9, the symbol 372 is deleted from the downlink portion 460 of the time division duplex frame 802 to form the modified-time-division-duplex frame 804, so the modified-time-division-duplex frame 804 has a reduced downlink portion 462. In this manner, the turn-around time 346 in the time division duplex frame 804 may be of longer duration than the turn-around time 350 of the time division duplex frame 802.

In operation, there may be two base stations (e.g., base station 100 and 101) in relative proximity to each other, one of which sends the modified-time-division-duplex frame 804 and the other of which sends the unmodified-time-division-duplex frame 802. The time division duplex frames 802 and 804 need to be properly aligned in order to prevent interference between the two base stations that are receiving different types (modified and unmodified) of time division duplex frames. The base stations are configured to schedule the time division duplex frames 802 and/or 804 and the subscriber stations 150 and 151 are capable of accepting this configuration.

At block 704, the first symbol 341 of the downlink portion 462 in modified-time-division-duplex frame 804 is aligned to the first symbol 371 of the downlink portion 460 of the unmodified-time-division-duplex frame 802. As shown in FIG. 9, this alignment is indicated by the arrow to the unmodified-time-division-duplex frame 802 from the modified-time-division-duplex frame 804 positioned below the unmodified-time-division-duplex frame 802. The start of the first symbol 341 in the modified-time-division-duplex frame 804 is aligned to the start of the first symbol 371 in the unmodified-time-division-duplex frame 802.

In one implementation of this embodiment, the last symbol 342 of the downlink portion 462 in modified-time-division-duplex frame 804' is aligned to the last symbol 372 of the downlink portion 460 of the unmodified-time-division-duplex frame 802. As shown in FIG. 9, this alignment is indicated by the arrow to the unmodified-time-division-duplex frame 802 from the modified-time-division-duplex frame 804' positioned above the unmodified-time-division-duplex frame 802. The start of the last symbol 342 in the modified-time-division-duplex frame 804' is aligned to the start of the last symbol 372 in the unmodified-time-division-duplex frame 802.

The number of symbols 370 may be decreased in either the downlink frame 460 or the number of symbols 380 can be decreased in the uplink frame 470. For an exemplary WiMAX system, the removal of each symbol 370 or 380 provides 10.3 km of additional distributed antenna system range based on a round trip delay in a length of optical fiber equal to 10 μs/km times the length of the fiber and the symbol duration of 103 μs.

In FIG. 8, the line 850 plots the coverage radius versus fiber length when no symbols are deleted from either the downlink frame 460 or the uplink frame 470 for an exemplary WiMAX system. Note that the maximum coverage radius is 8 km when the fiber length is zero (i.e., there is no fiber in the system). Likewise, if there is no over-the-air propagation of the signal, the maximum fiber length is less than 5.75 km.

There is a reduction of data throughput resulting from symbol deletion. Each deletion of symbol(s) reduces throughput by 2-3%. Specifically, deletion of one symbol reduces throughput to 97.7% of the maximum throughput. Line 852 plots the coverage radius versus fiber length when one symbol is deleted from either the downlink frame 460 or the uplink frame 470 for the exemplary WiMAX system. Deletion of two symbol reduces throughput to 95.4% of the maximum throughput. Line 854 plots the coverage radius versus fiber length when two symbols are deleted from either the downlink frame 460 or the uplink frame 470 for the exemplary WiMAX system. Deletion of three symbol reduces throughput to 93.3% of the maximum throughput. Line 856 plots the coverage radius versus fiber length when three symbols are deleted from either the downlink frame 460 or the uplink frame 470 for the exemplary WiMAX system.

In some embodiments, the data symbols are paired. In the case of an odd number of downlink symbols, such as down link/up link=29/18, one down link symbol 370 is used for a preamble symbol and the others are paired. Therefore, a minimum of two down link symbols must be deleted, leaving an overall reduction in system capacity of about 5% or a reduction in downlink capacity of approximately 7%. However, the resultant increase of the coverage radius to beyond 20 km suffices for all but a small percentage of extremely long distributed antenna system requirements.

Symbol deletion can increase the probability of interference. Not all base stations need to have the same frame profile. In one implementation of this embodiment, only the base station 101 with long fiber runs use symbol deletion. For example, if two base stations 100 and 101 (FIGS. 1A and 1B, respectively) within the same local area transmit on the same frequency, only the base station 101 with optical fiber, such as optical fiber 124, schedules data by deleting symbols. In this exemplary case, the base station 101 converts the last symbol 372 (in time division duplex frame 802) to turn-around time 346 (in time division duplex frame 804) to extend the time division duplex system range to over 10 km. However, the base station 100 does not delete the symbol in the time division duplex frame 802, but transmits the unmodified-time-division-duplex frame 802.

In order for the down link frame 462 to be aligned on first symbol 341, the two base stations 100 and 101 have the first symbol 341 of the down link frames 460 and 462, respectively, in sync. Also, all base stations 100 and 101 have the capability to delay the down link frame for up to 200 or 300 µs. This allows the down link frames 460 and 462, respectively, in these base stations 100 and 101 to be time synchronized. Of course, the base stations are separated, so there are offsets in the time division duplex frames 804 and 802 proportional to the offset in base station distances, depending on where the offset is measured. For a 6 km separation distance, the timing offset is about 20 µs as measured at each base station. At base station 100 there is no increase in the potential interference from as base station 101 because base station 101 is not transmitting during the last symbol. Also, at base station 101 there is no increase in the potential interference since the base station 101 is receiving uplink information at the same time as before. Increasing the time during which the base station neither transmits nor receives does not increase the possibility of causing interference or being subject to interference. The main additional source of interference is from the subscriber stations 150 and 151 within the same local area interfering with each other.

In the example above, due to the deleted symbol 372 from the time division duplex frame 802, the subscriber station 151 is capable of transmitting about 100 µs earlier than a subscriber station 150. Since the subscriber station 150 continues to receive until the last symbol 372 (one additional symbol than subscriber station 151) and since subscriber station 151 is able to transmit at SSRTG=50 µs after the end of the time division duplex frame 804 received at the subscriber station 151, there is a potential of 50 µs of overlap where subscriber station 150 is transmitting while subscriber station 151 is receiving. The impact of this overlap is diminished as the separation between the subscriber stations 151 and 150 increases, due to the reduced signal level received from the other subscriber station. Given that cells operating using the same frequencies are not adjacent, it is unlikely that the subscriber stations 100 and 101 are close enough to interfere as they are not usually on the same line of sight or if they are on the same line of sight, they are likely to be using directional antennas facing their respective base stations.

The embodiment in which the time division duplex frame 804' is aligned on last symbol 342 (FIG. 9) eliminates the probability of interference. Since the down link frames 802 and 804 end at approximately the same time at the subscriber stations 100 and 101, respectively, then the subscriber stations 100 and 101 will not interfere with each other while transmitting since the transmissions will be aligned at least within the second timing gap 346 (i.e., the SSRTG gap in a WiMAX system). In addition, the potential for base-station-to-base-station interference is eliminated since, again, the base station 101 is not transmitting on a symbol that would otherwise transmit from the base station 101. It might seem that since base station 100 starts transmitting one symbol early (i.e., 103 µs early for a WiMAX system) it has the potential of arriving at the base station 101 while base station 101 is still receiving the uplink frame. In fact, the receipt of the beginning of the first frame from the base station 101 is delayed by the over the air propagation, in this case by 20 µs, and the fiber delay, in this case 50 µs, for a total delay of 70 µs. Since the base station 101 begins its first downlink symbol early by an amount equal to the fiber delay of 50 µs, then the base station 101 is not into transmission mode by 70 µs+50 µs−100 µs=20 µs prior to arrival of the downlink frame from base station 100. It will have stopped receiving by an additional 60 µs due to the first timing gap (RTG). A significant advantage to this solution is that only the base stations requiring symbol deletion will need to adjust timing and this adjustment is to retard the down link frame 462 with respect to the GPS clock by up to 100 µs.

For both of these solutions, the subscriber stations 150 and 151 must be able to handle the frame format change when roaming from base station 100 to base station 101. In one implementation of this embodiment, the subscriber station 150 or 151 roams from a base station 100 with down link/up link=29/18. In another implementation of this embodiment, the subscriber station 150 or 151 roams from a base station 100 with down link/up link=27/18.

Figure 10:
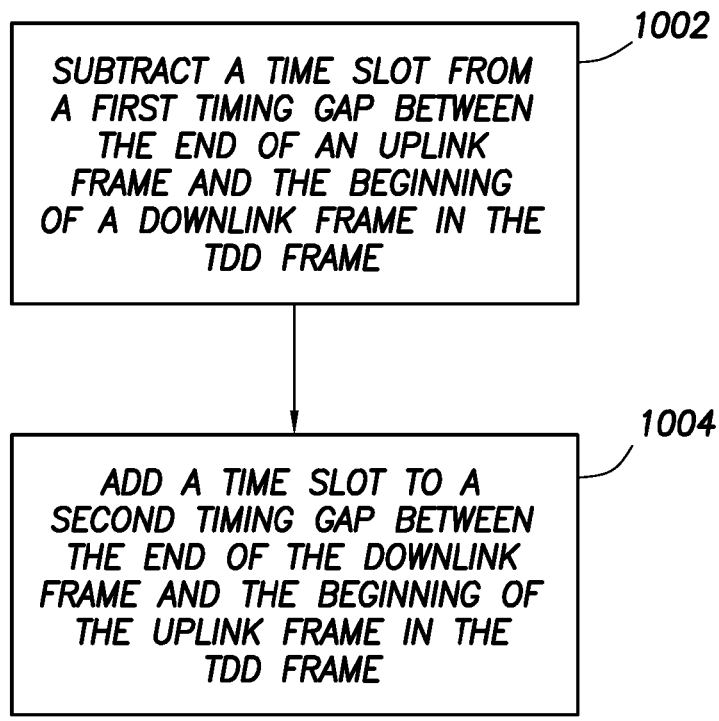
FIG. 10 is a flow diagram of a method of modifying time slots in a time division duplex frame being sent to a subscriber station over a communication link in accordance with the present invention.
Figure 11A:
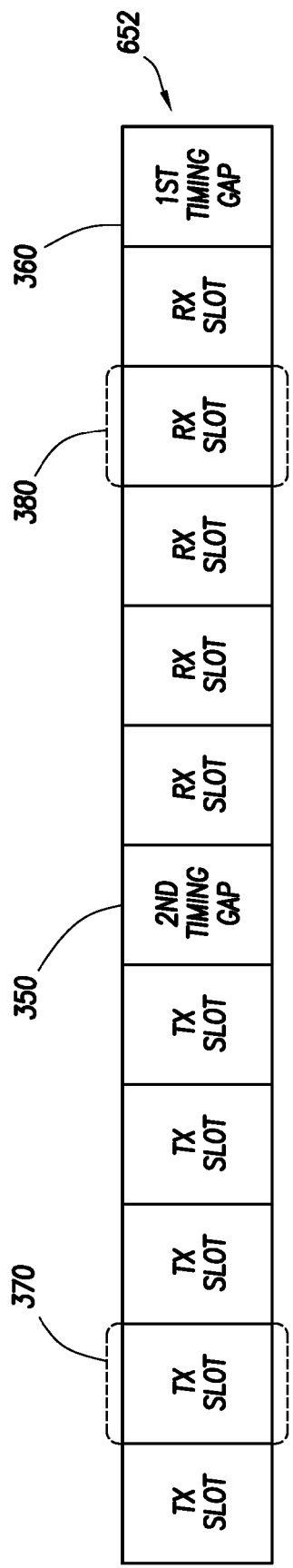
FIG. 11A is an exemplary time division duplex frame.
Figure 11B:
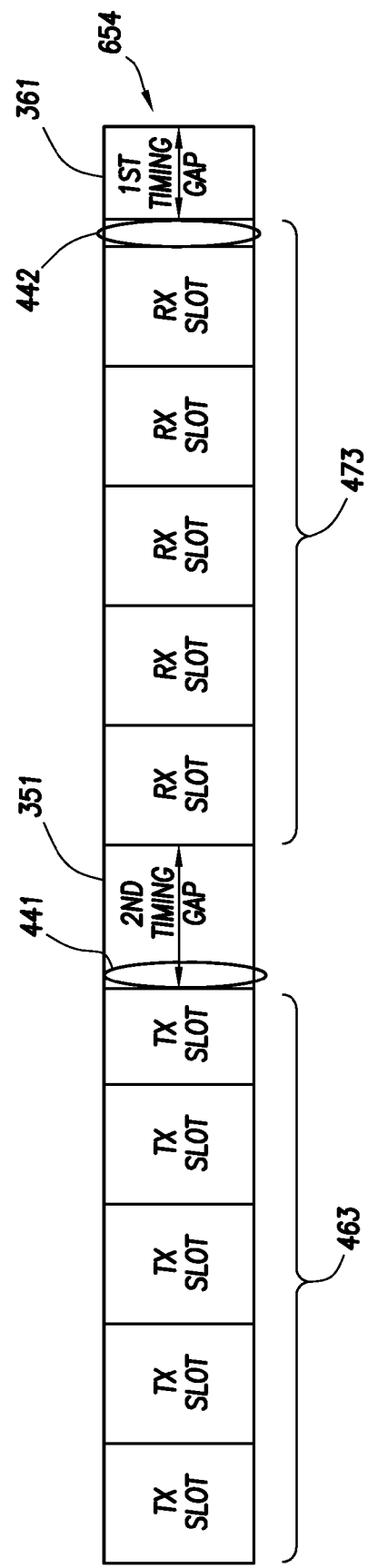
FIG. 11B is an exemplary time division duplex frame of FIG. 11A modified according to the method of FIG. 10.

FIG. 10 is a flow diagram of a method 1000 of modifying time slots in a time division duplex frame being sent to a subscriber station over a communication link in accordance with the present invention. FIG. 11A is an exemplary time division duplex frame 652. FIG. 11B is the exemplary time division duplex frame 654 of FIG. 11A modified according to the method 1000 of FIG. 10. Method 1000 is applicable to time division duplex system 15, in which an optical fiber is included in at least a portion of the communication link between a base station 101 and a subscriber station 151. Method 1000 is not applicable to time division duplex system 10, in which no optical fiber is included in at least a portion of the communication link between a base station 100 and a subscriber station 150.

At block 1002, a time slot is subtracted from a first timing gap between the end of an uplink frame and the beginning of a downlink frame in the time division duplex frame. At block 1004, a time slot is added to a second timing gap between the end of the downlink frame and the beginning of the uplink time division duplex frame.

As can be seen in the FIG. 2, the propagation delay (from fiber delay) decreases the second turn-around time (TTG) as the overall length of the communication link (including fiber distance and over-the-air distance) increases. Simultaneously, the first turn-around time (RTG) subsequently increases. The embodiment described with reference to method 1000 subtracts at least one physical slot 442 (FIG. 11B) from first turn-around time (RTG) 361 while adding the same number of physical slots 441 to the second turn-around time (TTG) 351. For a WiMAX system, the total number of symbols is maintained at 47 before and after the swapping of physical slots. This approach allows for up to an additional 6 km of optical fiber depending on the switching capability of the base station 151 (FIG. 1B). The reason that first turn-around time 361 (FIG. 11B) can be reduced in a distributed antenna system is that the extra fiber guarantees the subscriber station 101 a first turn-around time 361 that is at least as long as that specified by the WiMAX forum. The impact of a shorter first turn-around time 361 is on the base station and the first turn-around time 361 can only be shortened below the forum specifications if the base station can support it. This is not the case in a non-DAS (i.e., completely 'over-the-air' system) where the subscriber station may be close to the base station and experience the shorter first turn-around time 361 as experienced by the base station.

Although the base station 101 would not be compliant to the values proposed in the WiMAX forum, the communicatively coupled subscriber station 151 works with this profile. However, the lower limit on the first turn-around time 361 may not be supported by subscriber stations 150 close to the base station 100 in an over-the-air system (FIG. 1A) due to equipment limits on RF switching time and settling. It is possible, however, to schedule data from subscriber stations 151 close to the base station 101 earlier in the uplink frame thereby allowing longer switching times for first turn-around time 361 as long as the subscriber station 151 takes advantage of the lack of data scheduled in the last up link symbol(s). This does not necessarily impact the channel throughput as only the close-in subscriber stations 151 cannot use the last up link symbol(s). The last uplink symbol is available to other subscriber stations 151.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of scheduling time division duplex frames at a base station in a time division duplex system, the method comprising:
    determining that a round-trip propagation delay between the base station and a communicatively coupled subscriber station exceeds the difference between the base station turn-around time and the minimum allowed subscriber station turn-around time; and
    modifying time slots in a time division duplex frame being sent to the subscriber station over a communication link to extend the range of signals sent from the base station.

2. The method of claim 1, wherein determining that the round-trip propagation delay between the base station and the communicatively coupled subscriber station is greater than the difference between the base station turn-around time and the minimum allowed subscriber station turn-around time comprises:
    sending a ranging burst to the base station from the subscriber station;
    sending an advanced-timing ranging burst to the base station when the ranging burst is not recognized, wherein the advanced-timing ranging burst is received at an appropriate time slot at the base station; and
    synchronizing the subscriber station to the base station based on receiving the advanced-timing ranging burst at the appropriate time slot at the base station.

3. The method of claim 1, wherein determining that the round-trip propagation delay between the base station and the communicatively coupled subscriber station is greater than the difference between the base station turn-around time and the minimum allowed subscriber station turn-around time comprises:
    determining that the round-trip propagation delay between the base station communicatively coupled to the subscriber station via an optical fiber is greater than the difference between the base station turn-around time and the minimum allowed subscriber station turn-around time.

4. The method of claim 3, wherein modifying time slots in a time division duplex frame comprises:
    deleting at least one symbol from a downlink portion of the time division duplex frame to form a modified-time-division-duplex frame;
    aligning the modified-time-division-duplex frame on one of a first symbol in the modified-time-division-duplex frame or a last symbol in the modified-time-division-duplex frame; and
    sending the aligned modified-time-division-duplex frame on the optical fiber, wherein an over-the-air range of a remote antenna communicatively coupled to the optical fiber is increased responsive to forming the modified-time-division-duplex frame.

5. The method of claim 3, wherein modifying time slots in a time division duplex frame comprises:
    subtracting a time slot from a first timing gap between the end of an uplink frame and the beginning of a downlink frame in the time division duplex frame to decrease the first timing gap; and
    adding a time slot to a second timing gap between the end of the downlink frame and the start of the uplink frame in the time division duplex frame to increase the second timing gap, wherein a modified-time-division-duplex frame is formed, wherein the number of symbols in the time division duplex frame remains constant, and wherein an over-the-air range of a remote antenna that is communicatively coupled to the optical fiber is increased responsive to subtracting and adding the time slots.

6. The method of claim 5, wherein the time division duplex system comprises a WiMax system, wherein the subtracting a time slot from the first timing gap comprises subtracting a physical slot from the first timing gap, and wherein the adding a time slot to a second timing gap comprises adding a physical slot to the second timing gap.

7. The method of claim 3, wherein modifying time slots in a time division duplex frame comprises:
    scheduling data at the base station such that no data is scheduled for transmission to the subscriber station in a last symbol in a downlink portion of the time division duplex frame, wherein an over-the-air range of a remote antenna that is communicatively coupled to the optical fiber in increased responsive to the scheduling.

8. The method of claim 7, wherein the subscriber station is a first subscriber station, the method further comprising:
    determining that the round-trip propagation delay between the base station and a communicatively coupled second subscriber station is less than the difference between the base station turn-around time and the minimum allowed subscriber station turn-around time; and
    scheduling data at the base station such that data is scheduled for transmission to the second subscriber station in the last symbol in the downlink portion of the time division duplex frame.

9. The method of claim 3, further comprising:
    sending ranging burst to the base station from the subscriber station.

10. The method of claim 9, wherein determining that the round-trip propagation delay between the base station and the subscriber station communicatively coupled via the optical fiber is greater than the difference between the base station turn-around time and the minimum allowed subscriber station turn-around time comprises:
    recognizing that the base station does not receive the ranging burst within the allotted time responsive to sending the ranging burst to the base station from the subscriber station, the method further comprising:
    sending an advanced-timing ranging burst to the base station via the optical fiber when the subscriber station recognizes the ranging burst is not received within the allotted time, wherein the advanced-timing ranging burst is received at the appropriate time slot at the base station; and synchronizing the subscriber station to the base station based on the sending of the advanced-timing ranging burst.

11. The method of claim 1, wherein determining that the round-trip propagation delay between the base station and the subscriber station is greater than the difference between the base station turn-around time and the minimum allowed subscriber station turn-around time comprises:
determining that the propagation delay between the base station communicatively coupled to the subscriber station via a base station antenna is greater than the difference between the base station turn-around time and the minimum allowed subscriber station turn-around time.

12. The method of claim 11, further comprising:
sending ranging bursts to the base station from the subscriber station.

13. The method of claim 12, wherein determining that the round-trip propagation delay between the base station and the subscriber station communicatively coupled via the base station antenna is greater than the difference between the base station turn-around time and the minimum allowed subscriber station turn-around time comprises:
recognizing that the base station does not receive the ranging burst within the allotted time responsive to sending the ranging burst to the base station from the subscriber station, the method further comprising:
sending an advanced-timing ranging burst responsive to the base station via the base station antenna when the subscriber station recognizes that the ranging burst is not received within the allotted time, wherein the advanced-timing ranging burst is received at the appropriate time slot at the base station: and
synchronizing the subscriber station to the base station based on the sending of the advanced-timing ranging burst.

14. The method of claim 11, wherein modifying time slots in a time division duplex frame comprises:
deleting at least one symbol from a downlink portion of the time division duplex frame to form a modified-time-division-duplex frame;
aligning the modified-time-division-duplex frame on one of a first symbol in the modified-time-division-duplex frame or a last symbol in the modified-time-division-duplex frame; and
sending the aligned modified-time-division-duplex frame via the base station antenna, wherein an over-the-air range of the base station antenna is increased responsive to deleting the at least one symbol.

15. The method of claim 11, wherein modifying time slots in a time division duplex frame comprises:
scheduling data at the base station such that no data is scheduled for transmission to the subscriber station in a last symbol in a downlink portion of the time division duplex frame, wherein an over-the-air range of the base station is increased responsive to scheduling of data at the base station.

16. A method of scheduling time division duplex frames at a base station of a time division duplex system to extend a range of a communication link to a subscriber station, the method comprising:
recognizing a timing gap between the end of the downlink frame and the start of the uplink frame in a time division duplex frame is too short for the communication link to the subscriber station; and
modifying time slots in a time division duplex frame being sent a communication link to extend the range of signals sent from the base station, wherein the range of the communication link to the subscriber station is extended without degradation of the communication link.

17. The method of claim 16, further comprising:
sending a ranging burst to the base station from the subscriber station;
sending an advanced-timing ranging burst to the base station when the ranging burst is not recognized, wherein the advanced-timing ranging burst is received at an appropriate time slot at the base station;
synchronizing the subscriber station to the base station based on receiving the advanced-timing ranging burst at an appropriate time slot at the base station; and
transmitting a modified-time-division-duplex frame over the communication link.

18. A base station in a time division duplex system, the base station comprising:
a time-slot scheduler communicatively coupled to receive time-slot-modification instructions from a processor; and
at least one of:
a base station antenna communicatively coupled to the base station, or
an optical fiber communicatively coupled to both the base station and a remote antenna, wherein a range of signals propagating in the system is increased based on an implementation of the time-slot-modification instructions by the time-slot scheduler.

19. The base station of claim 18, wherein the time division duplex system is one of a distributed antenna system, a long term evolution (LTE) system, a WiMax system, an extended ranging WiMax system, and a time division duplex system having a fixed-time-frame protocol, a time division duplex system having a round-trip-delay time frame protocol, and combinations thereof.

20. The base station of claim 18, wherein the base station is communicatively coupled via the optical fiber to the remote antenna, and wherein the time-slot-modification instructions from the processor for a time division duplex frame to be modified for transmission on the optical fiber comprise one of:
instructions to delete at least one symbol from a downlink portion of the time division duplex frame, and align the downlink frame of the modified-time-division-duplex frame on one of a first symbol in the time division duplex frame or a last symbol in the time division duplex frame;
instructions to subtract a time slot from a first timing gap between the end of the uplink frame and the beginning of a downlink frame in the time division duplex frame, and to add a time slot to a second timing gap between the end of the downlink frame and the start of the uplink frame in the time division duplex frame, wherein the number of symbols in the time division duplex frame remains constant; and
instructions to schedule data at the base station such that no data is scheduled for transmission to the subscriber station in a last symbol in a downlink portion of the time division duplex frame, so that a remote antenna transmits an uplink portion of the time division duplex frame before the end of the downlink portion.

21. The base station of claim 18, wherein the base station is communicatively coupled to a base station antenna, and wherein the time-slot-modification instructions from the processor for a time division duplex frame to be modified for transmission via the base station antenna comprise one of:

instructions to delete at least one symbol from a downlink portion of the time division duplex frame, and align the downlink frame of the modified-time-division-duplex frame on one of a first symbol in the time division duplex frame or a last symbol in the time division duplex frame; and instructions to schedule data at the base station such that no data is scheduled for transmission to the subscriber station in a last symbol in a downlink portion of the time division duplex frame, so that a remote antenna transmits an uplink portion of the time division duplex frame before the end of the downlink portion.

22. A method of triggering a base station in a time division duplex system to modify time slots in a time division duplex frame being sent over a communication link to a subscriber station, the method comprising:

sending a ranging burst to the base station from the subscriber station;

sending an advanced-timing ranging burst to the base station when the ranging burst is not recognized, wherein the advanced-timing ranging burst is received at an appropriate time slot at the base station;

synchronizing the subscriber station to the base station based on receiving the advanced-timing ranging burst at an appropriate time slot at the base station, wherein the subscriber station recognizes an unmodified timing gap between the end of the downlink frame and the start of the uplink frame in a time division duplex frame is too short for the communication link to the subscriber station; and triggering the base station at the subscriber station to modify time slots in a time division duplex frame being sent over the communication link based on the synchronizing, wherein the range of signals sent from the base station to the subscriber station is extended.

23. The method of claim 22, wherein the base station is triggered to delete at least one symbol from a downlink portion of the time division duplex frame, and align the downlink frame of the modified-time-division-duplex frame on one of a first symbol in the time division duplex frame or a last symbol in the time division duplex frame.

24. The method of claim 22, wherein the base station is triggered to subtract a time slot from a first timing gap between the end of the uplink frame and the beginning of a downlink frame in the time division duplex frame, and to add a time slot to a second timing gap between the end of the downlink frame and the start of the uplink frame in the time division duplex frame, wherein the number of symbols in the time division duplex frame remains constant.

25. The method of claim 22, wherein the base station is triggered to schedule data at the base station such that no data is scheduled for transmission to the subscriber station in a last symbol in a downlink portion of the time division duplex frame, so that a remote antenna transmits an uplink portion of the time division duplex frame before the end of the downlink portion.

26. A non-transitory computer readable medium encoded with instructions stored thereon for a method of scheduling time division duplex frames at a base station in a time division duplex system, the method comprising:

determining that the round-trip propagation delay between the base station and a communicatively coupled subscriber station is greater than the difference between the base station turn-around time and the minimum allowed subscriber station turn-around time; and modifying time slots in a time division duplex frame being sent to the subscriber station over a communication link to extend the range of signals sent from the base station.

27. The non-transitory computer readable medium of claim 26, wherein the computer readable medium being encoded with instructions stored thereon for a method of determining if the round-trip propagation delay between the base station and a communicatively coupled subscriber station is greater than the difference between the base station turn-around time and the minimum allowed subscriber station turn-around time comprises a computer readable medium encoded with instructions stored thereon for a method of:

sending a ranging burst to the base station from the subscriber station;

sending an advanced-timing ranging burst to the base station when the ranging burst is not recognized, wherein the advanced-timing ranging burst is received at an appropriate time slot at the base station; and synchronizing the subscriber station to the base station based on receiving the advanced-timing ranging burst at the appropriate time slot at the base station.

28. The non-transitory computer readable medium of claim 26, wherein the computer readable medium being encoded with instructions stored thereon for a method of modifying time slots in a time division duplex frame comprises a computer readable medium encoded with instructions stored thereon for at least one a method of:

deleting at least one symbol from a downlink portion of the time division duplex frame, and aligning the downlink frame of the modified-time-division-duplex frame on one of a first symbol in the time division duplex frame or a last symbol in the time division duplex frame;

subtracting a time slot from a first timing gap between the end of the uplink frame and the beginning of a downlink frame in the time division duplex frame, and adding a time slot to a second timing gap between the end of the downlink frame and the start of the uplink frame in the time division duplex frame; and scheduling data at the base station such that no data is scheduled for transmission to the subscriber station in a last symbol in a downlink portion of the time division duplex frame.

29. A non-transitory computer readable medium encoded with instructions stored thereon for a method of triggering a base station in a time division duplex system to modify time slots in a time division duplex frame being sent over a communication link to a subscriber station, the method comprising:

sending a ranging burst to the base station from the subscriber station;

sending an advanced-timing ranging burst to the base station when the ranging burst is not recognized; and triggering the base station to modify time slots in a time division duplex frame being sent over the communication link based on the subscriber station being synchronized to the base station when the advanced-timing ranging burst is received at the base station in an appropriate time slot.

* * * * *